US008506202B2

(12) United States Patent
Nakagawa et al.

(10) Patent No.: US 8,506,202 B2
(45) Date of Patent: Aug. 13, 2013

(54) CONSTANT VELOCITY UNIVERSAL JOINT

(75) Inventors: Tohru Nakagawa, Iwata (JP); Yuichi Asano, Iwata (JP); Hiroshi Kawamura, Iwata (JP); Kiyoshige Yamauchi, Iwata (JP); Masahiro Ozawa, Iwata (JP); Kisao Yamazaki, Iwata (JP); Taku Itagaki, Iwata (JP)

(73) Assignee: NTN Corporation, Osaka (JP)

( * ) Notice: Subject to any disclaimer, the term of this patent is extended or adjusted under 35 U.S.C. 154(b) by 31 days.

(21) Appl. No.: 12/522,289

(22) PCT Filed: Jan. 17, 2008

(86) PCT No.: PCT/JP2008/050510
§ 371 (c)(1),
(2), (4) Date: Jul. 7, 2009

(87) PCT Pub. No.: WO2008/088007
PCT Pub. Date: Jul. 24, 2008

(65) Prior Publication Data
US 2009/0317177 A1    Dec. 24, 2009

(30) Foreign Application Priority Data

Jan. 17, 2007  (JP) .................................. 2007-008366
Mar. 29, 2007  (JP) .................................. 2007-088925
Apr. 2, 2007   (JP) .................................. 2007-096558
May 17, 2007   (JP) .................................. 2007-131822

(51) Int. Cl.
*F16D 1/072* (2006.01)
*F16D 3/20* (2006.01)

(52) U.S. Cl.
USPC .................... 403/359.6; 464/905; 464/906

(58) Field of Classification Search
USPC ................. 464/182, 905, 906, 144–146, 111, 464/11; 403/1, 359.1, 329.5, 359.6
See application file for complete search history.

(56) References Cited

U.S. PATENT DOCUMENTS 4,175,404 A   11/1979  Schopf
4,376,333 A    3/1983  Kanamaru et al.

(Continued)

FOREIGN PATENT DOCUMENTS

DE    4302726      8/1993
EP    2 031 262    3/2009

(Continued)

OTHER PUBLICATIONS

Machinery's Handbook, 26th ed., Industrial Press, 2000. pp. 2135, 2139, 2155.*

(Continued)

*Primary Examiner* — Gregory Binda
*Assistant Examiner* — Matthieu Setliff
(74) *Attorney, Agent, or Firm* — Wenderoth, Lind & Ponack, LLP

(57) ABSTRACT

A constant velocity universal joint having a recess-projection engagement configuration in which backlash at a shaft connecting region does not easily occur, and an inner joint component and a shaft can he firmly connected. hi the constant velocity universal joint, the inner joint component and the shaft (5) fitted into an axis hole (22) of the inner joint component are connected by die recess-projection engagement configuration. Engagement contacting regions (38) of projections (35) and recesses (36) corresponding thereto are in close contact over the whole region.

26 Claims, 26 Drawing Sheets

(56) References Cited

U.S. PATENT DOCUMENTS

| | | | |
|---|---|---|---|
| 4,886,392 A | 12/1989 | Iio | |
| 5,309,620 A * | 5/1994 | Shinohara et al. | 29/432 |
| 5,716,156 A * | 2/1998 | Bayer et al. | 403/282 |
| 5,938,534 A * | 8/1999 | Kurian et al. | 464/162 |
| 6,648,106 B2 * | 11/2003 | Hayabuchi et al. | 188/82.1 |
| 6,910,970 B2 | 6/2005 | Kobayashi | |
| 7,387,462 B2 * | 6/2008 | Häcker | 403/359.6 |
| 7,677,127 B2 * | 3/2010 | Maruyama et al. | 74/434 |
| 7,677,984 B2 * | 3/2010 | Hahn et al. | 464/182 |
| 2002/0169025 A1 | 11/2002 | Kobayashi | |
| 2003/0081872 A1 * | 5/2003 | Sahashi et al. | 384/544 |
| 2005/0148397 A1 | 7/2005 | Nakagawa et al. | |
| 2005/0172755 A1 * | 8/2005 | Burgler | 74/567 |
| 2006/0189396 A1 * | 8/2006 | Kozlowski et al. | 464/146 |
| 2009/0162134 A1 * | 6/2009 | Fukumura et al. | 403/1 |
| 2009/0245935 A1 * | 10/2009 | Kamikawa et al. | 403/359.1 |
| 2010/0209035 A1 * | 8/2010 | Ozawa et al. | 384/548 |
| 2010/0215302 A1 * | 8/2010 | Torii et al. | 384/490 |

FOREIGN PATENT DOCUMENTS

| | | |
|---|---|---|
| JP | 52-2245 | 1/1977 |
| JP | 62-51694 | 1/1980 |
| JP | 2-29262 | 4/1988 |
| JP | 2-17730 | 4/1990 |
| JP | 06-312322 | 11/1994 |
| JP | 08-068426 | 3/1996 |
| JP | 2000-120649 | 4/2000 |
| JP | 2001-323920 | 11/2001 |
| JP | 2002-310180 | 10/2002 |
| JP | 2003-314580 | 11/2003 |
| JP | 2005-117816 | 4/2005 |
| JP | 2005-188620 | 7/2005 |
| JP | 2005-193757 | 7/2005 |
| JP | 2007-2943 | 1/2007 |
| JP | 2007333154 A * | 12/2007 |
| JP | 2007333155 A * | 12/2007 |
| WO | 2005/054699 | 6/2005 |
| WO | 2007/145019 | 12/2007 |

OTHER PUBLICATIONS

International Search Report mailed May 1, 2008 for International Application No. PCT/JP2008/050510.

International Preliminary Report on Patentability and Written Opinion of the International Searching Authority dated Jul. 30, 2009 for International Application No. PCT/JP2008/050510.

Supplementary European Search Report issued Sep. 30, 2011 in corresponding European Patent Application No. 08703365.0.

* cited by examiner (a)

(b)

(a)

(c)   (b)

(a)

(b)

RECESS FORMING LENGTH
WHEN RECESS IS INTERMITTENTLY PROCESSED

RECESS FORMING LENGTH
WHEN RECESS IS CONSECUTIVELY PROCESSED

CONSTANT VELOCITY UNIVERSAL JOINT

BACKGROUND OF THE INVENTION

1. Technical Field

The present invention relates to a fixed or slide-type constant velocity universal joint used in a power transmission system in automobiles and various industrial machineries. The fixed-type or slide-type constant velocity universal joint is mounted on a drive shaft or a propeller shaft used in, for example, a front-engine, front-wheel drive (FF) vehicle, a four-wheel drive (4WD) vehicle, and a front-engine, rear-wheel drive (FR) vehicle. In particular, the present invention relates to a constant velocity universal joint including a recess-projection engagement configuration by which an inner joint component is connected to a shaft.

2. Description of the Related Art

For example, a drive shaft of an automobile has a configuration in which a slide-type constant velocity universal joint is mounted on one axial end of the shaft and a fixed constant velocity universal joint is mounted on another axial end.

In a tripod constant velocity universal joint (TJ) that is one slide-type constant velocity universal joint used as a connecting joint of the drive shaft, three track grooves are formed on an inner circumferential surface in an axial direction. The constant velocity universal joint includes an outer joint component (outer member) and an inner joint component (tripod component). The outer joint component has a roller guiding surface in the axial direction on both sides of each track groove. The inner joint component includes three leg shafts projecting in a radial direction. A rolling element (roller) is housed between the leg shafts of the inner joint component and the roller guiding surfaces of the outer joint component such as to rotate freely.

A Birfield constant velocity universal joint (BJ) mat is a fixed constant velocity universal joint includes an outer joint component (outer member) and an inner joint component (inner member). In the outer joint component, a plurality of track grooves are formed on an inner spherical surface along an axial direction, the track grooves being equal distances apart in a circumferential direction. In the inner joint component, a plurality of track grooves forming a pair with the track grooves on the outer joint component are formed on an outer spherical surface along the axial direction, the track grooves being equal distances apart in a circumferential direction. A plurality of balls that transmit torque are interposed between the track grooves on the outer joint component and the track grooves on the inner joint component. A cage that holds the balls is interposed between the inner spherical surface of the outer joint component and the outer spherical surface of the inner joint component.

A configuration in which the axial end of the shaft is pressed into an axis hole inner diameter of the inner joint component is used as a connection configuration between the slide-type constant velocity universal joint or the fixed constant velocity universal joint, and the shaft. A female spline is formed on the axial hole inner diameter of the inner joint component and a male spline is formed on an axial end outer diameter of the shaft as a recess portion and a projection portion running along the axial direction.

A hardening process by, for example, induction hardening or carburizing and quenching is performed on the axial hole inner diameter of the inner joint component on which the female spline is formed and on the axial end outer diameter of the shaft on which the male spline is formed, thereby forming hardened layers. Strength of the axial hole inner diameter of the inner joint component and the axial end outer diameter of the shaft is ensured by the hardened layers being formed.

The axial end outer diameter of the shaft is pressed into the axial hole inner diameter of the inner joint component, and the male spline and the female spline mesh. As a result, the shaft is fitted into the inner joint component. As a result of spline engagement between the shaft and the inner joint component, torque can be transmitted therebetween (refer to, for example, FIG. 2 in Patent Document 1: Japanese Patent Laid-Open Publication No. 2003-314580).

In a connection configuration between the inner joint component and the shaft such as this, there is that in which a stopper ring with a round cross-section attached to the axial end of the shaft comes into contact with a locking surface provided on the inner joint component, thereby serving as a dislocation stopper (refer to, for example, Patent Document 2: Japanese Patent Laid-Open Publication No. Heisei 8-68426).

Patent Document 1: Japanese Patent Laid-Open Publication No. 2003-314580

Patent Document 2: Japanese Patent Laid-Open Publication No. Heisei 8 (1996)-68426

SUMMARY OF THE INVENTION

1. Problems to be Solved by the Invention

In an engagement configuration between the inner joint component of the constant velocity universal joint and the shaft, described above, the hardening-processed female spline is formed on the axial hole inner diameter of the inner joint component. The hardening-processed male spline is formed on the axial end outer diameter of the shaft. As a result, the axial end outer diameter of the shaft presses into the axial hole inner diameter of the inner joint component and spline engagement is performed.

However, the engagement configuration between the inner joint component and the shaft is a recess- and projection engagement by the hardening-processed female spline and the hardening-process male spline. Therefore, there is a problem in that backlash easily occurs. When a backlash such as this is present, it becomes difficult to accurately transmit rotational torque with accuracy. In addition, when torque is intermittently added, tooth flanks of the splines rub against each other, possibly causing a decrease in fatigue strength of the splines. Moreover, abnormal noise may occur because of the backlash.

When the dislocation stopper is provided by the stopper ring in the connection configuration between the inner joint component and the shaft, groove processing for stopper ring engagement is required for the shaft and locking surface processing is required for the inner joint component. Moreover, because a number of processes increase and the stopper ring is required, a number of components increase and product cost rises.

The present invention is proposed in light of the above-described issues. An object of the present invention is to provide a constant velocity universal joint having a recess-projection engagement configuration in which backlash at a shaft connecting region does not easily occur, and an inner joint component and a shaft can be firmly connected.

2. Means for Solving the Problems

A constant velocity universal joint of the present invention is a constant velocity universal joint including an outer joint component, an inner joint component pressed into the outer joint component, and a torque transmitting component that is interposed between the outer joint component and the inner joint component and performs torque transmission. The constant velocity universal joint has a recess-projection engagement configuration that connects the inner joint component and a shaft press-fitted into the inner joint component. Engagement contacting regions of projections of at least one of the inner joint component or the shaft and recesses of a partner component engaging with the projections are in close contact over the whole region.

In the constant velocity universal joint of the present invention, because the engagement contacting regions of the projections and the recesses of the partner component engaging with the projections are in close contact over the whole region, in the engagement configuration, a gap that causes backlash in the radial direction and the circumferential direction is not formed.

A hardened layer is formed by induction hardening on an outer diameter side of the inner joint component, an inner diameter side of the inner joint component is in an un-quenched state, and in the recess-projection engagement configuration, engagement contacting regions of projections on the outer diameter surface of the shaft and recesses on axis hole inner diameter surface of the inner joint component that engages with the projections are in close contact over the whole region.

In this case, because the inner diameter side of the inner joint component is in the un-quenched state, the inner diameter side of the inner joint component is relatively soft. Therefore, an improvement in facilitation of engagement (close contact) when the projections on the outer diameter surface of the shaft engage with the recesses on the axis hole inner diameter surface of the inner joint component can be achieved. Occurrence of backlash in the radial direction and the circumferential direction can be accurately suppressed. Moreover, because the hardened layer is formed on the outer diameter side of the inner joint component, improvements can be achieved in the strength and durability of the inner joint component. In particular, because the hardened layer is formed by induction hardening, the inner diameter side can be prevented from hardening. The un-quenched state of the inner diameter side can be stably ensured. In addition, the recess-projection engagement configuration can be formed with certainly simply by the hardened layer being formed on the projections of the outer diameter surface of the shaft by heat treatment and the shaft being pressed into the axis hole.

In the recess-projection engagement configuration, projections extending in the axial direction are formed on the outer diameter surface of the shaft. Recess grooves running along a circumferential direction are provided on the inner diameter surface of the axis hole of the inner joint component. The shaft is pressed into the axis hole of the inner joint component. Recesses engaging in close contact with the projections are intermittently formed in the axial direction on the inner diameter surface of the axis hole of the inner joint component by the projections of the shaft. The engagement contacting regions of the projections of the shaft and the recesses of the inner joint component are in close contact over the whole region.

In the recess-projection engagement configuration, as a result of the shaft being pressed into the axis hole of the inner joint component, transfer of the shape of the projections is performed on a recess forming surface on a partner side (inner diameter surface of the axis hole of the inner joint component). At this rime, as a result of the projections wedging into the inner diameter surface of the axis hole of the inner joint component, the axis hole is in a slightly expanded state, allowing movement of the projections in the axial direction.

When the movement in the axial direction stops, the axis hole decreases in diameter to return to an original diameter. As a result, the engagement contacting regions of the projections and the recesses of the partner component engaging with the projections are in close contact over the whole region. Therefore, in the engagement configuration, a gap that causes backlash in the radial direction and the circumferential direction is not formed.

A protruded section (pushed-out section) formed when the shaft presses into the axis hole of the inner joint component is cut at the intermittent section of the recesses (recess groove section along the circumferential direction). Therefore, the protruded section can be prevented from interfering with the press-fitting. In other words, resistance that pushes out the protruded section (pushed-out section) is reduced, thereby reducing press-fitting load. When surface pressure applied to the projections is reduced, chipping and wear of the projections can be reduced. Formability of the recesses is improved. In addition, because an engagement length in the recess-projection engagement configuration can be increased, an improvement in torsional strength can be achieved. Stable rotation transmission can be performed.

In the recess-projection engagement configuration, projections extending in the axial direction are provided on the inner diameter surface of the axis hole of the inner joint component and recess grooves running along the circumferential direction are formed on the outer diameter surface of the shaft. The shaft is pressed into the axis hole of the inner joint component. Recesses engaging in close contact with the projections are intermittently formed in the axial direction on the outer diameter surface of shaft by the projections of the inner joint component. The engagement contacting regions of the projections of the inner joint component and the recesses of the shaft are in close contact over the whole region.

In the recess-projection engagement configuration, as a result of the shaft being pressed into the axis hole of the inner joint component, transfer of the shape of the projections on the inner joint component is performed on a recess forming surface on a partner side (outer diameter surface of the shaft). At this time, as a result of the projections wedging into the outer diameter surface of the shaft, the axis hole is in a slightly expanded state, allowing movement of the projections in the axial direction. When the movement in the axial direction stops, the axis hole decreases in diameter to return to an original diameter. As a result, the engagement contacting regions of the projections and the recesses (outer diameter surface of the shaft) of the partner component engaging with the projections are in close contact over the whole region. Therefore, in the engagement configuration, in a similar manner to the above-described first constant velocity universal joint, a gap that causes backlash in the radial direction and the circumferential direction is not formed.

The constant velocity universal joint can be that using a ball as the torque transmitting component. Alternatively, the constant velocity universal joint (tripod constant velocity universal joint) can include an outer joint component on which three track grooves having roller guiding surfaces facing each other in the circumferential direction are formed, a tripod component serving as the inner joint component including three leg shafts protruding in a radial direction, and rollers serving as a torque transmitting component fitted onto the leg shafts such as to rotate freely and inserted into the track grooves. The rollers can move in the axial direction of the outer joint component along the roller guiding surfaces. A constant velocity universal joint using the ball as the torque transmitting component can be a fixed-type, such as the Birfield constant velocity universal joint (BJ) and the undercut-free constant velocity universal joint (UJ). Moreover, the constant velocity universal joint can be a slide-type such as a cross-groove-type constant velocity universal joint (U) and a double-offset-type constant velocity universal joint (DOJ). In other words, the Birfield constant velocity universal joint (BJ), the undercut-free constant velocity universal joint (UJ), and the double-offset-type constant velocity universal joint (DOJ) include an outer member serving as the outer joint component in which a plurality of guide grooves extending in the axial direction are formed on an inner circumferential surface, an inner member serving as the inner joint component in which a plurality of guide grooves extending in the axial direction are formed on an outer circumferential surface, torque transmitting balls disposed on ball tracks formed by the guiding grooves of the outer member and the guiding grooves of the inner member working in cooperation, and a holder having pockets that holds the torque transmitting balls. The cross-groove-type constant velocity universal joint (LJ) includes an outer member serving as the outer joint component in which a guide groove twisted in one circumferential direction to an axial line and a guide groove twisted in another circumferential direction are alternately provided on an inner circumferential surface, an inner member serving as the inner joint component in which guiding grooves are formed on an outer circumferential surface thereof each of which forms a pair with each guiding groove of the outer member and is twisted in the opposite direction of the counterpart guiding groove of the outer member, and a holder holding the torque transmitting balls.

Projections provided on one of either an outer diameter surface of the shaft or an inner diameter surface of the inner joint component and extending in an axial direction are pressed into the other along the axial direction, and recesses engaging with the projections in close contact are formed on the other by the projections. In other words, transfer of the shape of the projections is performed on a recess forming surface on a partner side. At this time, as a result of the projections wedging into the recess forming surface on the partner side, the axis hole is in a slightly expanded state, allowing movement of the projections in the axial direction. When the movement in the axial direction stops, the axis hole decreases in diameter to return to an original diameter. As a result, the engagement contacting regions of the projections and the recesses of the partner component engaging with the projections are in close contact over the whole region.

In the constant velocity universal joint of the present invention, one of either the track grooves of the outer joint component or the track grooves of the inner joint component is formed by cold forging finish. Constituent elements including the outer joint component, the inner joint component, the balls, and a cage can be mounted by random matching. The inner joint component and the shaft fitted into the axis hole of the inner joint component are connected by the recess-projection engagement configuration as described above. Engagement contacting regions of the projections of one of either the inner joint component or the shaft and the recesses of the partner component engaging with the projections are in close contact over the whole region.

In other words, each constituent element is mounted by random matching. One of either the track grooves of the outer joint component or the track grooves of the inner joint component is formed by cold forging finish. As a result, only the cold forging finish is performed to form the track grooves. Grinding finish after turning and heat treatment that has been performed in the past become unnecessary. Therefore, cost reduction of the constant velocity universal joint can be achieved.

Here, "random matching" refers to when the outer joint component and the inner joint component of which the track grooves are formed by cold forging finish are arbitrarily combined without performing selected combining in which, from among a large number of outer joint components, inner joint components, balls, and cages, constituent elements including the outer joint component, the inner joint component, the balls, and the cage can be selected and combined such that PCD (Pitch Circle Diameter) gap and the like fall within a range of defined values.

As a result of the PCD gap falling within the range of defined values, backlash can be kept to a required minimum. Total backlash increases when the cold forging finish and random matching (matching suspension) without a tight-fit engagement being performed between the inner joint component and the shaft. Therefore, when tight-fit engagement is not used, random matching becomes difficult to apply.

The constant velocity universal joint can be a fixed-type, such as the Birfield constant velocity joint (BJ) and the undercut-free constant velocity universal joint (UJ), or a slide-type, such as the double-offset-type constant velocity universal joint (DOJ). In BJ, each overall track groove is formed into a curved line. In UJ, one end of each track groove is a fixed type formed in a straight shape in parallel with an axial line.

In the recess-projection engagement configuration between the inner diameter surface of the inner joint component and the shaft, a gap that causes backlash in the radial direction and the circumferential direction is not formed. In addition, a PCD gap of the ball tracks formed by the track grooves of the outer joint component and the track grooves of the inner joint component working in cooperation with the outer joint component is preferably −0.02 to +0.3 millimeters. As a result, backlash between each constituent element including the outer joint component, the inner joint component, the shaft, the balls, and the cage can be kept to a required minimum. In particular, the backlash can be kept to a required minimum by the tight-fit engagement and the PCD gap being set in this way. When the PCD gap is smaller than −0.02 mm, operability of the constant velocity universal joint becomes difficult to ensure. On the other hand when the PCD gap is greater than +0.3 mm, even when the backlash between the inner joint component and the shaft is eliminated, total backlash in the constant velocity universal joint increases. Problems such as torque transmission loss and abnormal noise caused by the increase become a concern.

A horizontal cross-sectional shape of the track grooves of the outer joint component and the track grooves of the inner joint component is preferably a gothic arch that is in angular contact with the balls. As a result, a contacting state of the ball to the track groove can be stabilized.

Projections can be formed on the shaft. Recesses that engage in close contact with the projections can be formed on an axis hole inner diameter surface of the inner joint component by the projection by hardness of at least an axial direction end section of the projections being higher than that of the axis hole inner diameter section of the inner joint component and the shaft being pressed into the axis hole of the inner joint component from the axial direction end section side of the projections. In addition, projections can be formed on an inner diameter surface of the axis hole of the inner joint component. Recesses that engage in close contact with the projections can be formed on an outer diameter surface of the shaft by the projection by hardness of at least an axial direction end section of the projections being higher than that of outer diameter section of the shaft and the projections on the inner joint component side being pressed into the shaft from the axial direction end section side thereof.

A pocket section for storing a protruded section formed as a result of recess formation by the press-fitting is preferably provided on the shaft. At this time, the pocket section for storing the protruded section formed as a result of recess formation by the press-fitting can be provided on the shaft, or the pocket section can be provided on the inner diameter surface of the axis hole of the inner joint component. Here, the protruded section is material of an amount of a volume of the recess into which the engagement contacting region of the projection is fitted (engaged). The protruded section is configured by material that is pushed out from the formed recesses, material that is cut to form the recesses, both material that is pushed out and material that is cut, and the like.

The pocket section for storing the protruded section is preferably provided on a press-fitting starting end side of the projections of the shaft. A shoulder section for centering with the axis hole of the inner joint component is preferably provided on a counter-projection side of the pocket section.

Any region of a projection in a projecting direction corresponds with a recess forming surface before the recess is formed. At this time, a maximum diameter dimension of an arc connecting peaks of a plurality of projections provided on a shaft outer diameter may be greater than an inner diameter dimension of the axis hole of the inner joint component. A maximum outer diameter dimension of a shaft outer diameter surface between adjacent projections may be smaller than the inner diameter dimension of the axis hole of the inner joint component. A minimum diameter dimension of an arc connecting peaks of a plurality of projections on the axis hole may be smaller than an outer diameter dimension of the inner joint component fitting section of the shaft. A minimum inner diameter dimension of an axis hole inner diameter surface between adjacent projections may be greater than the outer diameter dimension of the inner joint component fitting section of the shaft.

A circumferential direction thickness of a projecting direction intermediate region of the projection is preferably smaller than a circumferential direction dimension at a position corresponding to the intermediate region between projections adjacent in the circumferential direction. As a result of a setting such as this, total sum of the circumferential direction thickness of the projecting direction intermediate regions of the projections is smaller than a total sum of the circumferential direction thickness at positions corresponding to the intermediate regions of the projections of the partner side engaging between projections adjacent in the circumferential direction.

A recess-projection running along the axial direction is preferably provided on at least a portion of the projection side in the axial direction. The recess-projection running along the axial direction on the projection side may be formed into a saw-tooth shape.

3. Advantage of the Invention

In the recess-projection engagement configuration of the present invention, a gap causing backlash in the radial direction and the circumferential direction is not formed. As a result, all engagement regions contribute to rotational torque transmission. A stable rotational torque transmission can be performed. A decrease in fatigue strength of splines caused by tooth flanks of the splines rubbing against each other can be prevented. Superior durability can be achieved. Moreover, abnormal noise does not occur. Furthermore, because close contact is made without a gap therebetween in the radial direction and the circumferential direction, strength of a torque transmitting region increases. The constant velocity universal joint can be made lighter and more compact.

Projections provided on one of either the outer diameter surface of the shaft and the inner diameter surface of the axis hole of the inner joint component can be pressed into the other along the axial direction. Recesses that engage in close contact with the projections can be formed on the other by the projections. Therefore, the recess-projection engaging configuration can be formed with certainty. Moreover, a spline section and the like are not required to be formed on a component on which the recesses are formed. Superior manufacturability can be achieved. Phase alignment between splines is not required. An improvement in facilitation of assembly work can be achieved. Moreover, damage to tooth flanks during press-fitting can be prevented, and a stable engagement state can be maintained.

When the projections are provided on the shaft and the hardness of the projection side is higher than that of the axis hole inner diameter side of the inner joint component, recess formation onto the axis hole inner diameter surface of the inner joint component during press-fitting can be facilitated. In addition, the hardness of the shaft side can be increased, thereby improving torsional strength of the shaft. When the projections are formed on the inner diameter surface of the axis hole of the inner joint component and the hardness of the axial direction end section of the projection side is higher than the outer diameter section of the shaft, recess formation onto the shaft side outer diameter surface can be facilitated. Hardening process (heat treatment) on the shaft side is not required to be performed. Therefore, superior shaft manufacturability can be achieved.

As a result of the pocket section storing the protruded section formed as a result of the recess formation by press-fitting being provided, the protruded section can be held (maintained) within the pocket section and does not slip into the constant velocity universal joint. In other words, the protruded section can remain housed within the pocket section. The protruded section removal operation is not required to be performed. A number of assembly operations can be reduced. Assembly workability can be improved and cost can be reduced.

As a result of the shoulder section for centering being provided on an axial direction counter-projection side of the pocket section, the protruded section within the pocket section does not fly out towards the shoulder section side. The protruded section is more stably housed. Moreover, because the shoulder section is for centering, the shaft can be pressed into the inner joint component while preventing center misalignment. Therefore, the inner joint component and the shaft can be connected with high accuracy. A stable torque transmission can be performed.

As a result of any region in the projecting direction of the projections being disposed on the recess forming surface before the recess is formed, the recesses wedge into the recess forming surface, allowing the recesses to be formed with certainty.

As a result of the circumferential direction thickness of the projecting direction intermediate region of the projections being less than the dimension at the position corresponding to the intermediate region between recesses adjacent in the circumferential direction, the circumferential direction thickness of the projecting direction intermediate region of the projections (projections between the recesses being formed) on the side on which the recesses are formed can be increased. Therefore, the shear area of the projections on the partner side (the projections with low hardness between recesses as a result of the recesses being formed) can be increased. Torsional strength can be ensured. Moreover, because the tooth thickness of the projections on the side with high hardness is small, the press-fitting load can be decreased. An improvement in facilitation of press-fitting can be achieved.

As a result of the recess-projection running along the axial direction being provided on at least a portion of the projection side in the axial direction, when press-fitting is performed, the projection recess running along the axial direction wedges into the side having a low hardness (the side on which the recesses into which the projections fit are formed) along the axial direction. As a result of the wedging, a dislocation stopper for the inner joint component in the axial direction of the shaft can be configured. As a result of the projection recess having a saw-tooth shape, the saw-tooth further wedges into the side with the low hardness. Therefore, the dislocation stopping mechanism becomes stronger. As a result, a stable connection state can be maintained. A higher quality constant velocity universal joint can be achieved. Moreover, the dislocation stopper can be configured at the projection recess running along the axial direction. Therefore, a stopper ring fitting groove is not required to be provided on the shaft and a locking surface is not required to be provided on the inner joint component The number of processes and the number of components can be reduced. Manufacturing cost can be reduced and assembly workability can be improved.

DETAILED DESCRIPTION OF THE INVENTION

Embodiments of the present invention will be hereinafter described in detail. According to the embodiments below, when the present invention is applied to a fixed (Birfield-type) constant velocity universal joint (BJ) is given as an example. However, the present invention can also be applied to other fixed constant velocity universal joints, such as an undercut-free constant velocity universal joint (UJ). Moreover, the present invention can also be applied to a slide-type constant velocity universal joint, such as a cross groove constant velocity universal joint (LJ), a double offset constant velocity universal joint (DOJ), and a tripod constant velocity universal joint (TJ).

Figure 1:
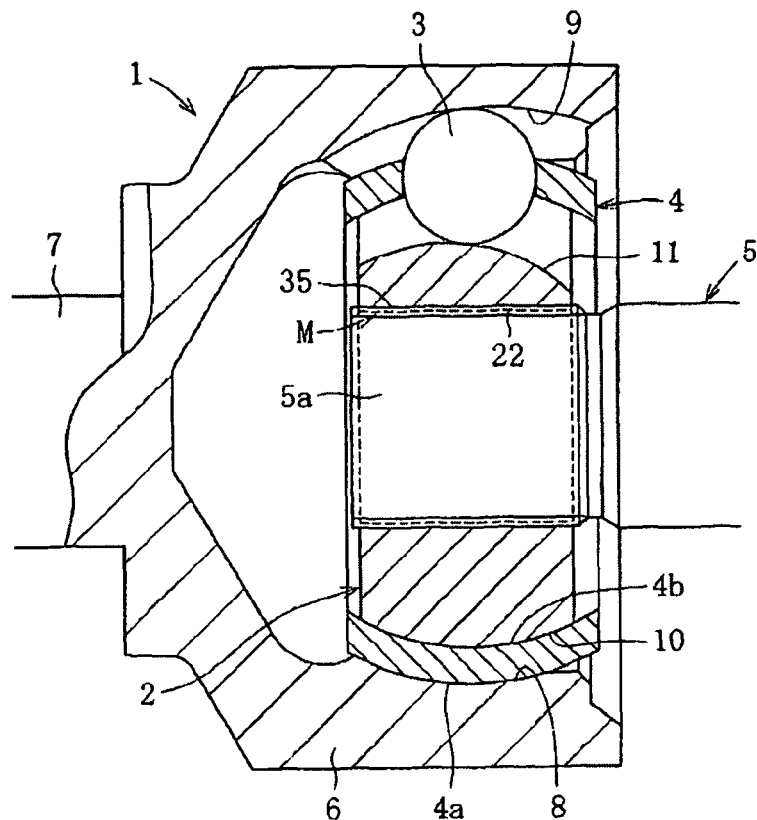
FIG. 1 is a cross-sectional view of a constant velocity universal joint of the present invention using a recess-projection engagement configuration.

FIG. 1 shows an example of an overall configuration of the Birfield constant velocity universal joint using a recess-projection engagement configuration. The constant velocity universal joint includes an outer member 1, an inner member 2, a ball 3, and a cage 4 as main components. The outer member 1 serves as an outer joint component. The inner member 2 serves as an inner joint component pressed into the outer member 1. The ball 3 is interposed between the outer member 1 and the inner member 2, and serves as a torque transmitting component that transmits torque. The cage 4 is interposed between the outer member 1 and the inner member 2, and holds the ball 3. When the fixed constant velocity universal joint is applied to a drive shaft, the outer member 1 is connected to a wheel bearing device (not shown). A shaft 5 is connected to the inner member 2 by a recess-projection engagement configuration M of the present invention. As a result, torque can be transmitted at a constant speed even in a state in which rotation axes of the outer member 1 and the inner member 2 are at an angle.

The outer member 1 includes a mouth section 6 and a stem section 7. The outer member 1 is connected to the wheel bearing device at the stem section 7 to allow torque transmission. The mouth section 6 is shaped into a bowl that has an opening on one end. A plurality of track grooves 9 extending in an axial direction are formed on an inner spherical surface 8 of the mouth section 6, the track grooves 9 being equal distances apart in a circumferential direction. The track grooves 9 extend to the opening end of the mouth section 6. On an outer spherical surface 10 of the inner member 2, a plurality of track grooves 11 extending in the axial direction are formed, the track grooves 11 being equal distances apart. The track grooves 11 cut through in the axial direction of the inner member 2.

Figure 37:
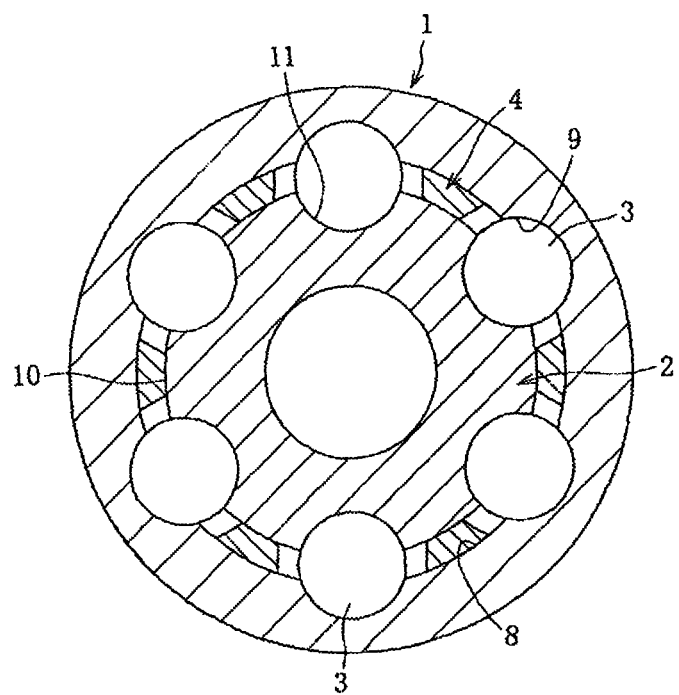
FIG. 37 is a horizontal cross-sectional view of the constant velocity universal joint.

A track groove 9 on the outer member 1 and a track groove 11 on the inner member 2 form a pair. The ball 3, serving as a torque transmitting element, is mounted on each ball track configured by each pair of track groove 9 and track groove 11 in a rotatable manner (a cross-sectional view of when six balls are provided is shown in FIG. 37). The ball 3 is interposed between the track groove 9 on the outer member 1 and the track groove 11 on the inner member 2 and transmits torque. The cage 4 is interposed between the outer member 1 and the inner member 2 in a slidable manner. The cage 4 comes into contact with the inner spherical surface 8 of the outer member 1 at an outer spherical surface 4a and comes into contact with the outer spherical surface 10 of the inner member 2 at an inner spherical surface 4b.

As described above, the inner member 2 is connected to the shaft 5 to allow torque transmission by an end section 5a of the shaft 5 being pressed into an axis hole 22 of the inner member 2. In other words, the shaft 5 and the inner member 2 are connected by the recess-projection engagement configuration M according to a first embodiment of the present invention. An inner diameter surface 37 of the axis hole 22 of the inner member (see FIG. 2) is formed by cold forging finish. However, the inner diameter surface 37 can also be formed by turning and polish finishing.

Figure 3:
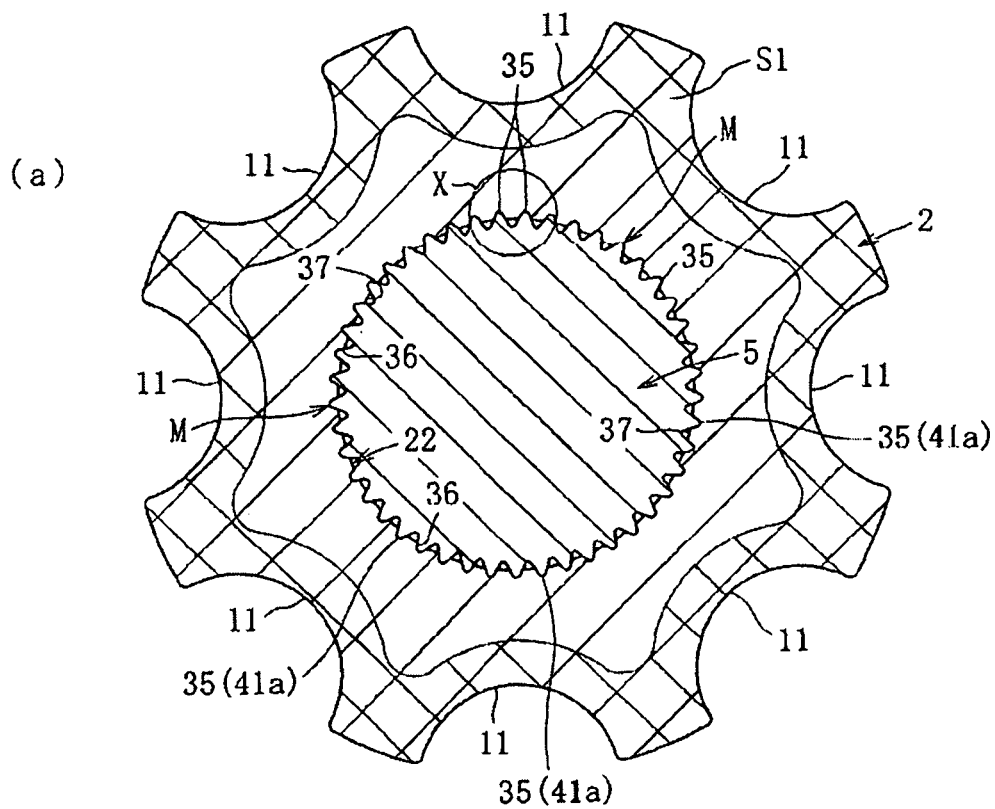
FIG. 3 are diagrams of the recess-projection engagement configuration of the constant velocity universal joint; (a) is an enlarged cross-sectional view; and (b) is an enlarged view of a section X in (a)
Figure 3:
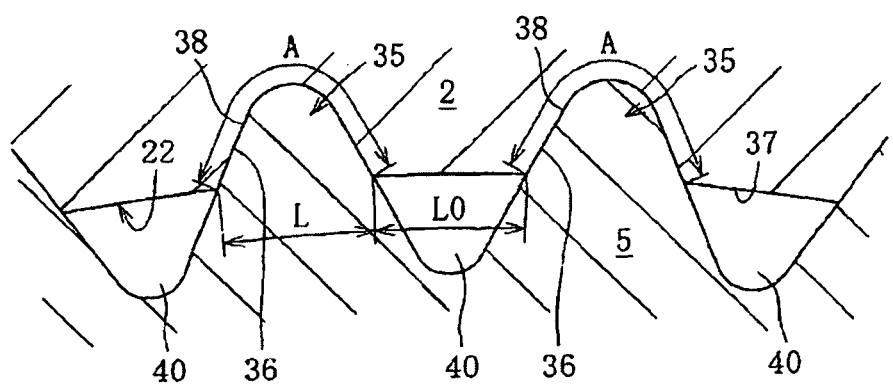

As shown in FIG. 3, the recess-projection engagement configuration M includes, for example, a projection 35 and a recess 36. The projection 35 is provided on the shaft 5 side and extends in the axial direction. The recess 36 is formed on the inner diameter surface 37 of the axial hole 22 of the inner member 2. Engagement contacting regions 38 of the projection 35 and of the recess 36 on the inner member 2 engaging with the projection 35 are in close contact over the whole region. A plurality of projections 35 are disposed at a predetermined pitch along the circumferential direction. A plurality of recesses 36 into which the projections 35 fit are formed on the inner spherical surface 37 of the inner member 2 along the circumferential direction. In other words, along an entire circumference in the circumferential direction, the projections 35 and the recesses 36 engaging with the projections 35 are closely engaged.

In this case, any region in a projecting direction of a projection (projecting direction intermediate section in the diagram) corresponds with a position of a recess forming surface before the recess is formed. In other words, each projection 35 has a triangular (sloped) cross-section having a projection, arc-shaped peak. The engagement contacting regions 38 of each projection 35 and recess 36 of the inner member 2 are region A shown in FIG. 3(b). The region A is a region from a middle of a slope to the peak in the cross-section. A gap 40 is formed between projections 35 adjacent in the circumferential direction. The gap 40 is formed closer to an inner diameter side than the inner diameter surface 37 of the inner member 2. Rather than the projection direction intermediate section of all projections 35 corresponding to the position of the recess forming surface before the recess is formed, some projections 35 can correspond thereto.

In the present invention, in the recess-projection engagement configuration M, the engagement contacting regions 38 of the projection 35 and of the recess 36 on the inner member 2 are in close contact over the whole region. Therefore, in the recess-projection engagement configuration M, a gap causing backlash in a radial direction and the circumferential direction is not formed. As a result, all engagement regions contribute to rotational torque transmission. A stable rotational torque transmission can be performed. A decrease in fatigue strength of splines caused by tooth flanks of the splines rubbing against each other can be prevented. Superior durability can be achieved. Moreover, abnormal noise does not occur. Furthermore, because close contact is made without a gap therebetween in the radial direction and the circumferential direction, strength of a torque transmitting region increases. The constant velocity universal joint can be made lighter and more compact.

Figure 2:
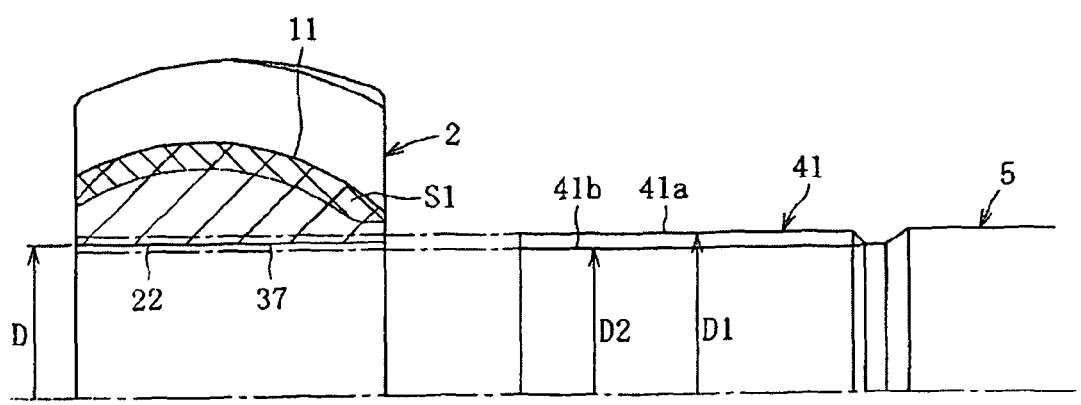
FIG. 2 is a cross-sectional view of the recess-projection engagement configuration in an exploded state.
Figure 4:
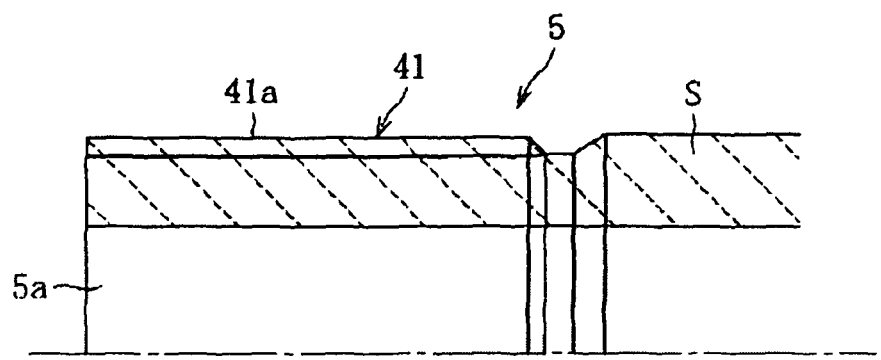
FIG. 4 is a side view of main components of a shaft connected to the constant velocity universal joint.
Figure 5:
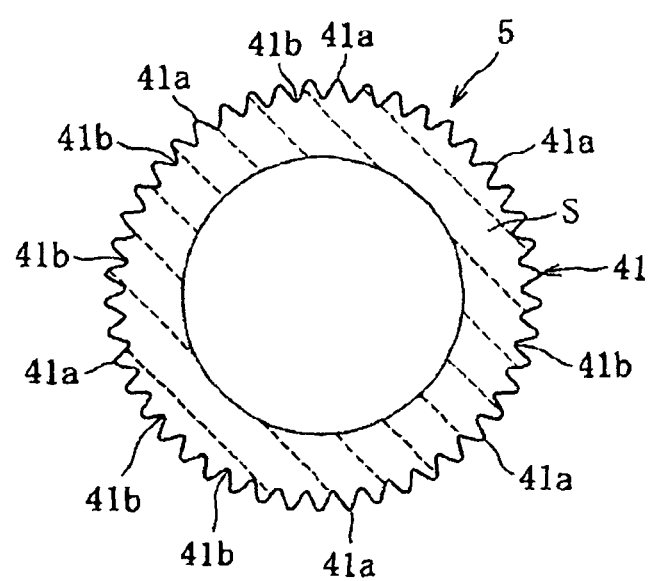
FIG. 5 is a front view of the shaft.

Next, an engaging method in the recess-projection engagement configuration M will be described. In this case, as shown in FIG. 4 and FIG. 5, a thermoset processing is performed on an outer diameter section of an end section 5a of the shaft 5. A spline 41 is formed including a projection 41a and a recess 41b running along the hardened layer S in the axial direction. Therefore, the projection 41a of the spline 41 is hardening-processed. The projection 41a becomes the projection 35 of the recess-projection engagement configuration M. At this time, an inner diameter surface 37 of the axis hole 22 of the inner member 2 is an un-hardened section on which the thermoset processing has not been performed. As the thermoset processing, various heat treatments can be used, such as induction hardening, and carburizing and quenching. Here, induction hardening is a quenching method to which a principle is applied in which a section required for quenching is placed within a coil through which a high frequency current is flowing. Joule heat is generated by electromagnetic induction. A conductive body is then heated. Carburizing and quenching is a quenching method in which carbon infiltrates or is dispersed from a surface of a low carbon material. Quenching is subsequently performed. In FIG. 4 and FIG. 5, a hatched section hatched by dotted lines indicates the hardened layer S. A hardness difference between the hardened layer S and the un-hardened section of the inner diameter surface 37 of the axis hole 22 of the inner member 2 is 30 points or more in HRC. A module of the spline 41 of the shaft 5 is small teeth of 0.5 or less. Here, the module is a pitch circle diameter divided by a number of teeth. As shown in FIG. 2 and FIG. 3, on the inner member 2, a hardened layer S1 (cross-hatched section) is formed on outer spherical surfaces of track grooves and between track grooves by induction hardening. The inner diameter surface 37 of the axis hole 22 is un-hardened. If induction hardening is performed, the surface can become hard and the interior can retain the hardness of the material. The inner diameter side of the inner member 2 can maintain an un-quenched state. Therefore, the inner diameter surface 37 side of the axis hole 22 of the inner member 2 is an un-hardened section (un-quenched state) at which the thermoset processing is not performed.

Any region in the projecting direction of the projection 35 corresponds with the position of the recess forming surface before the projection is formed (in this case, the inner diameter surface 37 of the axis hole 22 of the inner member 2). In other words, as shown in FIG. 2, an inner diameter dimension D of the inner diameter surface 37 of the axis hole 22 is set to be smaller than a maximum outer diameter dimension of the projection 35, namely a maximum diameter dimension (circumscribed circle diameter) D1 of a circle connecting the peaks of the projections 35 that are the projections 41a of the spline 41. The inner diameter dimension D is also set to be greater than a maximum outer diameter dimension of shaft outer diameter surfaces between adjacent projections, namely a maximum diameter dimension D2 of a circle connecting the bottoms of the recesses 41b of the spline 41. In other words, D2<D<D1. The spline 41 can be formed by various processing methods that have been public knowledge since the past, such as a component rolling process, a cutting process, a pressing process, and an extraction process.

In the recess-projection engagement configuration M, first, as shown in FIG. 2, in a state in which an axial center of the inner member 2 and an axial center of the shaft 5 are aligned, the shaft 5 is inserted (pressed) into the inner member 2. At this time, the inner diameter dimension D of the inner diameter surface 37 of the axis hole 22, the maximum outer diameter D1 of the projections 35, and the maximum outer diameter dimension D2 of the recesses of the spline 41 have a relation such as that described above. Moreover, the hardness of the projection 35 is greater than the hardness of the inner diameter surface 37 of the axis hole 22 by 30 points or more. Therefore, as the shaft 5 is pressed into the axis hole 22 of the inner member 2, the projection 35 wedges into the inner diameter surface 37. The projection 35 forms the recess 36 into which the projection 35 is fitted along the axial direction.

As a result, as shown in FIGS. 3(a) and (b), a engaged state can be configured in which the engagement contacting regions 38 of the projections 35 of the end section 5a of the shaft 5 and the recesses 36 of the inner member 2 are in close contact over the whole region. In other words, transfer of the shape of the projections 35 is performed on the recess forming surface on a partner side (in this case, the inner diameter surface 37 of the axis hole 22). The recess-projection engagement configuration M can be formed.

As according to the above-described embodiment, the spline 41 formed on the shaft 5 uses small teeth with a module of 0.5 or less. Therefore, formability of the spline 41 can be improved. Moreover, press-fitting load can be reduced. The projections 35 can be configured by a spline that is ordinarily formed on this type of shaft. Therefore, the projections 35 can be easily formed at a low cost.

As the recesses 36 are formed by the shaft 5 being pressed into the inner member 2, a work-hardening occurs on the recess 36 side. Here, work-hardening refers to when resistance to deformation increases as a degree of deformation increases, when plastic deformation (plastic working) is performed on an object. The object becomes harder than a material that has not been deformed. Therefore, as a result of the plastic deformation occurring during press-fitting, the inner diameter surface 37 of the inner member 2 on the projection 36 side hardens, achieving an improvement in rotational torque transmission.

In the spline 41 shown in FIG. 3, a pitch of the projections 41a and a pitch of the recesses 41b are set to be the same. Therefore, according to the above-described embodiment, as shown in FIG. 3(b), a circumferential direction thickness L of a projection direction intermediate region of the projections 35 and a circumferential direction dimension L0 at a position corresponding to the intermediate region between the projections 35 adjacent in the circumferential direction are almost the same.

Figure 6:
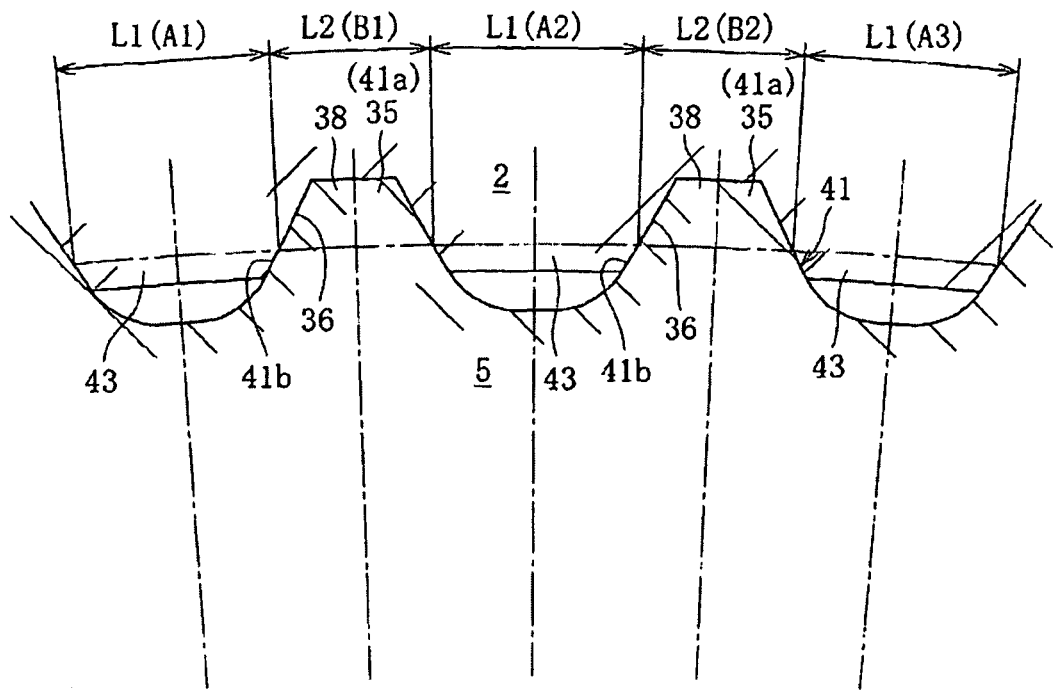
FIG. 6 is an enlarged cross-sectional view of main components showing a variation example of the recess-projection engagement configuration.

On the other hand, as shown in FIG. 6, a circumferential direction thickness L2 of the projecting direction intermediate region of the projections 35 can be smaller than a circumferential direction dimension L1 at a position corresponding to the intermediate region between the projections 35 adjacent in the circumferential direction. In other words, in the spline 41 formed on the shaft 5, the circumferential direction thickness (tooth thickness) L2 of the projecting direction intermediate region of the projections 35 is smaller than the circumferential direction thickness (tooth thickness) L1 of the projecting direction intermediate region of the partner side engaging between the projections 35, namely the projections 43 on the inner member 2 side.

Therefore, a total sum of the tooth thicknesses of the projections (projection teeth) 35 on the shaft 5 side (ΣB1+B2+B3+ . . . ) is set to be smaller than a total sum of the tooth thicknesses of the projections 43 on the entire circumference of the inner member 2 side (ΣA1+A2+A3+ . . . ). As a result, a shear area of the projection 43 on the inner member 2 side can be increased and torsional strength can be ensured. Moreover, because the tooth thickness of the projections 35 is small, the press-fitting load can be reduced. Facilitation of press-fitting can be improved. When the total sum of the circumferential direction thicknesses of the projections 35 is smaller than the total sum of the circumferential direction thicknesses of the projections 43 on the partner side, the circumferential direction thickness L2 of all projections 35 is not required to be smaller than the circumferential direction dimension L1 between the projections 35 adjacent in the circumferential direction. In other words, among the plurality of projections 35, when the circumferential direction thickness of an arbitrary projection 35 is the same as a dimension in the circumferential direction between projections adjacent in the circumferential direction or greater than the dimension in the circumferential direction, merely the total sum is required to be smaller. The projection 35 in FIG. 6 has a trapezoidal cross-section (Mount Fuji-shaped).

Because the inner diameter side of the inner member 2 maintains the un-quenched state, the inner diameter side of the inner member 2 is relatively soft. Therefore, when the shaft 5 is pressed into the axis hole 22 of the inner member 2, formability of the recesses 36 that closely engages with the projection 35 on the axis hole inner diameter surface 37 by the projections 35 on the outer diameter surface of the shaft 5 is favorable. An improvement in the facilitation of engagement (close contact) when the projections 35 on the outer diameter surface of the shaft 5 engage with the recesses 36 on the axis hole inner diameter surface of the inner member can be achieved. Occurrence of backlash in the radial direction and the circumferential direction can be accurately suppressed. Moreover, because the hardened layer S1 is formed on the outer diameter side of the inner member 2, improvements can be achieved in the strength and durability of the inner member 2. In particular, because the hardened layer S1 is formed by induction hardening, the inner diameter side can be prevented from hardening. The un-quenched state of the inner diameter side can be stably ensured.

Figure 7:
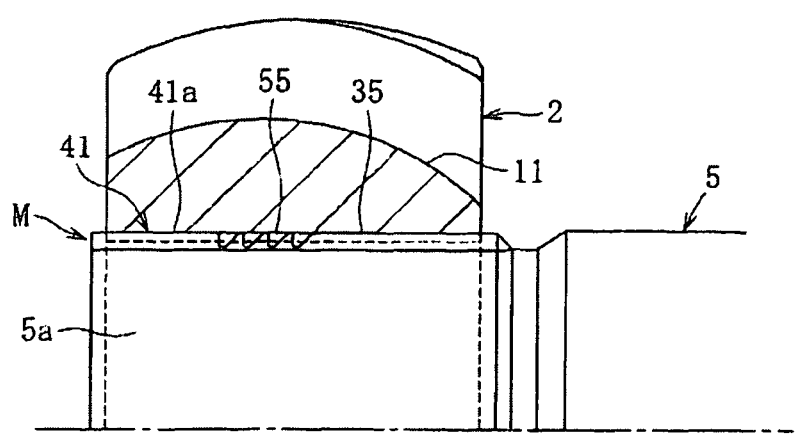
FIG. 7 is a cross-sectional view of another recess-projection engagement configuration.

Next, FIG. 7 shows another embodiment. In the recess-projection engagement configuration M, a projection recess 55 running along the axial direction is formed on a portion of the projection 35 of the shaft 5, namely the projection 41*a* of the spline 41, in the axial direction. In this case, the projection recess 55 is formed in a saw-tooth shape running along the axial direction. In this case, a cross-section of a projection (projection tooth) 55*a* in an axial direction is a right triangle of which a shaft end surface side is an angled surface.

Figure 8:
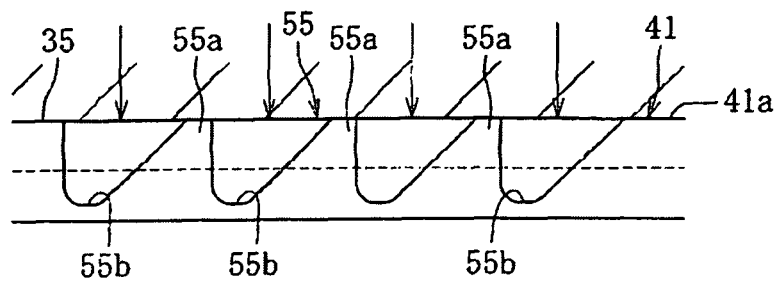
FIG. 8 is a an enlarged cross-sectional view of main components of the recess-projection engagement configuration in FIG. 7.
Figure 9:
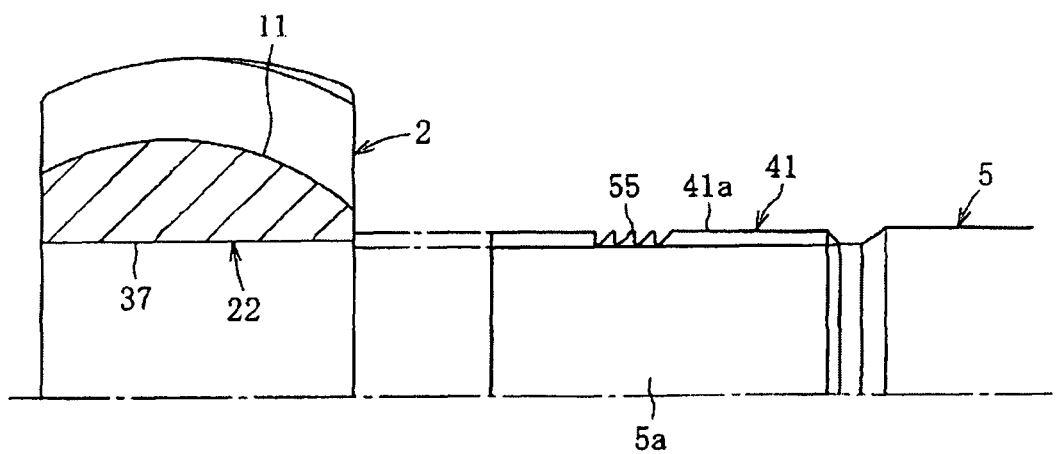
FIG. 9 is a cross-sectional view of FIG. 7 in an exploded state.

As shown in FIG. 9, when the axial center of the inner member 2 and an axial center of the shaft 5 are aligned and the shaft 5 including the projection recess 55 is pressed into the axis hole 22 of the inner member 2, the projections 35 on the shaft 5 side form the recesses 36 on the inner member 2. In this case, the projection recess 55 wedges into a bottom section of the recesses 36 formed on the inner member 2 side. In other words, the axis hole 22 of the inner member 2 that expands in diameter during press-fitting decreases in diameter such as to return to an original state after the press-fitting is completed. Therefore, a pressing force (diameter reduction force) works on the projection recess 55 from the inner diameter surface side of the axis hole 22 of the inner member 2, as shown by an arrow in FIG. 8. The projections 55*a* of the projection recess 55 wedge into the inner diameter surface of the axis hole 22 of the inner member 2.

As a result of the projection recess 55 running along the axial direction being provided in at least a portion in the axial direction on the projection 35 side, the projection recess 55 running along the axial direction wedges into the side having a low hardness (the side on which the recesses 36 into which the projections 35 fit are formed) along the axial direction. As a result of the wedging, a dislocation stopper for the inner joint component in the axial direction of the shaft 5 can be configured. As a result of the projection recess 55 having the saw-tooth shape, the saw-tooth further wedges into the side with the low hardness. Therefore, the dislocation stopping mechanism becomes stronger. As a result, a stable connection state can be maintained. A higher quality constant velocity universal joint can be achieved. Moreover, the dislocation stopper can be configured at the projection recess 55 running along the axial direction. Therefore, a stopper ring fitting groove is not required to be provided on the shaft 5 and a locking surface is not required to be provided on the inner joint component. The number of processes and the number of components can be reduced. Manufacturing cost can be reduced and assembly workability can be improved.

Figure 10:
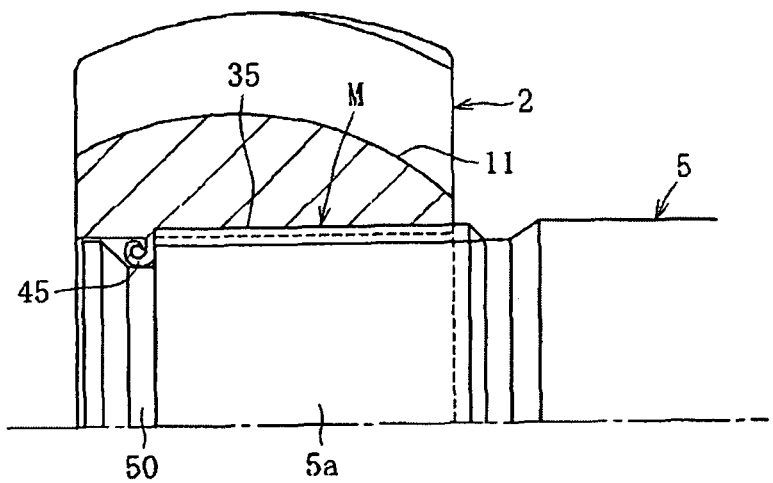
FIG. 10 is a cross-sectional view of still another recess-projection engagement configuration.

When the shaft 5 is pressed into the inner member 2, material is pushed out from the recesses 36 formed by the projections 35. Protruded sections 45, such as that shown in FIG. 10, are formed. The protruded section 45 is the material of an amount of a volume of the recess 36 into which the engagement contacting region 38 of the projection 35 is fitted (engaged). The protruded section 45 is configured by material that is pushed out from the formed recesses 36, material that is cut to form the recesses 36, both material that is pushed out and material that is cut, and the like.

Therefore, in the constant velocity universal joint shown in the above-described FIG. 1, after the shaft 5 is mounted on the inner member 2, a protruded section 45 removing operation is required. Therefore, according another embodiment shown in FIG. 10, a pocket section 50 that houses the protruded section 45 is provided on the shaft 5.

Figure 11:
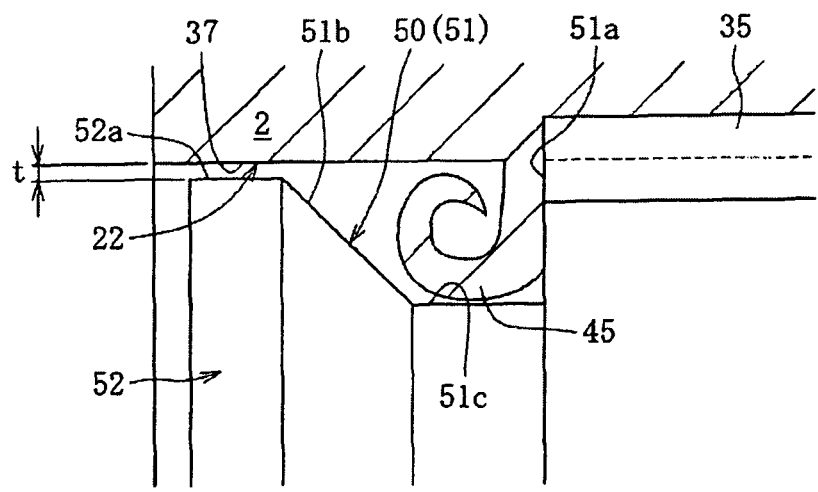
FIG. 11 is an enlarged cross-sectional view of main components of the recess-projection engagement configuration in FIG. 10.

In other words, the pocket section 50 is formed by a circumferential direction groove 51 being formed on an axial end edge of the spline 41 of the shaft 5. As shown in FIG. 11, a side wall 51*a* of the circumferential direction groove 51 on the spline 41 side is a flat surface perpendicular to the axial direction. A side surface 51*b* on a counter-spline side is a tapered surface of which the diameter expands from a groove bottom 51*c* towards the counter-spline side.

A disk-shaped shoulder section 52 for centering is provided closer to the counter-spline side than the side surface 51*b*. An outer diameter dimension of the shoulder section 52 is set to be the same as a hole diameter of the axis hole 22 to slightly smaller than the hole diameter D of the axis hole 22. In this case, a minute gap t is provided between an outer diameter surface 52*a* of the shoulder section 52 and the inner diameter surface 37 of the axis hole 22.

Figure 12:
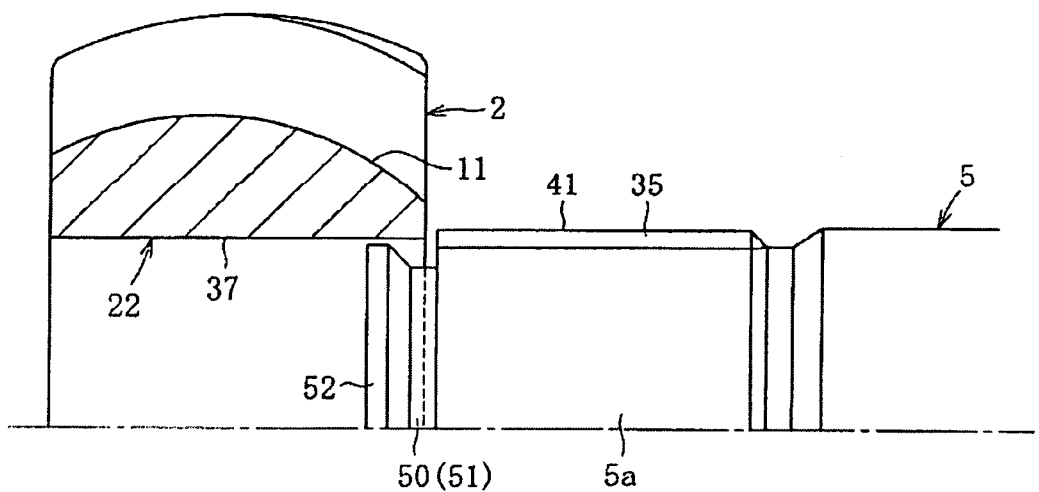
FIG. 12 is a cross-sectional view of the recess-projection engagement configuration in FIG. 10 in an assembled state.

Even in the inner member 2 shown in FIG. 10, as shown in FIG. 12, if the axial center of the inner member 2 and the axial center of the shaft 5 are aligned and the shaft 5 is pressed into the axis hole 22 of the inner member 2, the recesses 36 are formed on the inner member 2 side by the projections 35 on the shaft 5 side. At this time, the formed protruded section 45 is housed within the pocket section 50 while curling, as shown in FIG. 11.

In this way, as a result of the pocket section 50 housing the protruded section 45 formed as a result of recess formation by press-fitting being provided as described above, the protruded section 45 can be held (maintained) within the pocket section 50 and does not slip into the constant velocity universal joint. In other words, the protruded section 45 can remain housed within the pocket section 50. The protruded section 45 removal operation is not required to be performed. A number of assembly operations can be reduced. Assembly workability can be improved and cost can be reduced.

As a result of the shoulder section 52 for centering with the axis hole 22 of the inner member 2 being provided on a counter-projection side of the pocket section 50, the protruded section 45 within the pocket section 50 does not fly out towards the shoulder section 52 side. The protruded section 45 is more stably housed. Moreover, because the shoulder section 52 is for centering, the axis section can be pressed into the axis hole 22 of the inner member 2 while preventing center misalignment. Therefore, the inner member 2 and the shaft 5 can be connected with high accuracy. A stable torque transmission can be performed.

Because the shoulder section 52 is for centering during press-fitting, an outer diameter dimension thereof is preferably set to be about slightly smaller than the hole diameter of the inner member 2. In other words, if the outer diameter dimension of the shoulder section 52 is the same as the hole diameter of the inner member 2 or greater than the hole diameter of the inner member 2, the shoulder section 52 itself is pressed into the axis hole of the inner member 2. When the outer diameter dimension of the shoulder section 52 is excessively smaller than the hole diameter of the axis hole, the shoulder section 52 does not function as that for centering. Therefore, the minute gap t between the outer diameter surface 52a of the shoulder section 52 and the inner diameter surface of the axis hole is preferably set to about 0.01 mm to 0.2 mm.

Another configuration of the constant velocity universal joint shown in FIG. 10 is similar to the constant velocity universal joint shown in FIG. 1. Same components are given the same reference numbers as those in FIG. 1. Explanations thereof are omitted. Therefore, the constant velocity universal joint shown in FIG. 10 achieves operational effects similar to those of the constant velocity universal joint shown in FIG. 1.

Figure 13:
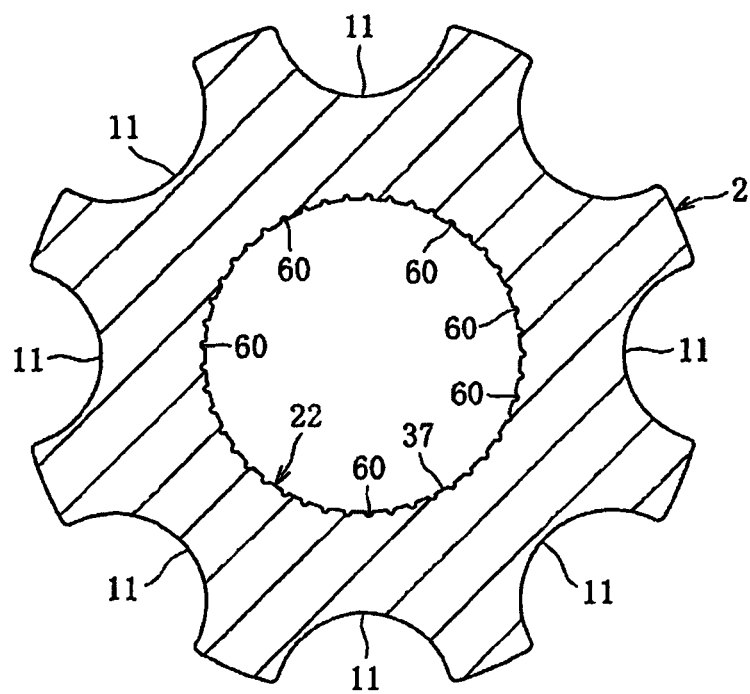
FIG. 13 is a cross-sectional view of another inner member configuring the recess-projection engagement configuration of the present invention.
Figure 14:
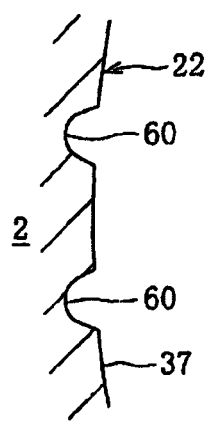
FIG. 14 is an enlarged cross-sectional view of main components of the inner member of the constant velocity universal joint in FIG. 13.

As shown in FIGS. 13 and 14, small recesses 60 can be provided at a predetermined pitch along the circumferential direction on the inner diameter surface of the axis hole 22 of the inner member 2. The small recess 60 is required to be smaller than the volume of the recess 36. As a result of the small recesses 60 being provided, facilitation of press-fitting of the projections 35 can be improved. In other words, as a result of the small recesses 60 being provided, the volume of the protruded sections 45 formed when the projections 35 are press-fitted can be reduced, and press-fitting resistance can be reduced. Moreover, because the protruded sections 45 can be reduced, the volume of the pocket sections 50 can be reduced. Facilitation of processing of the pocket sections 50 and the strength of the shaft 5 can be improved. The shape of the small recess 60 is semi-elliptical. However, various shapes such as rectangular can be used. The number of small recesses 60 can be arbitrarily set.

Figure 38:
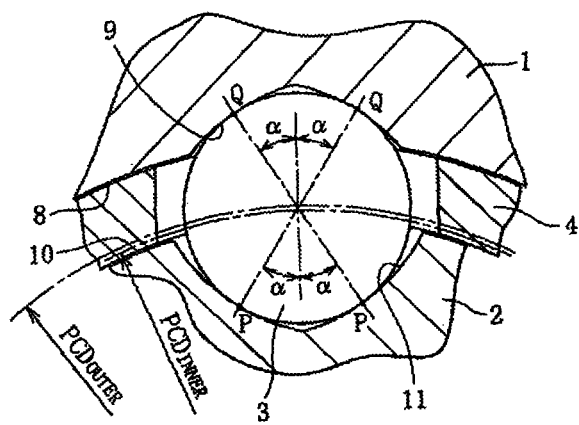
FIG. 38 is a cross-sectional view of a variation example of a track groove.

A horizontal cross-sectional shape of the track groove 9 of the outer member 1 and the track groove 11 of the inner member 2 can be a gothic arch that is in angular-contact with the balls 3, as shown in FIG. 38. The track grooves 9 and 11 having the gothic arch shape has two ball contacting points P and Q (ball contacting angle α) that are in angular-contact with the balls 3. An angular-contact such as this is preferable in terms of stabilizing a contacting state of the balls 3 to the track grooves 9 and 11. In other words, as a result of the horizontal cross-sectional shape of the track grooves 9 and 11 being the gothic arch, the contacting state of the balls can be stabilized and a smooth rotation transmission can be performed.

Figure 15A:
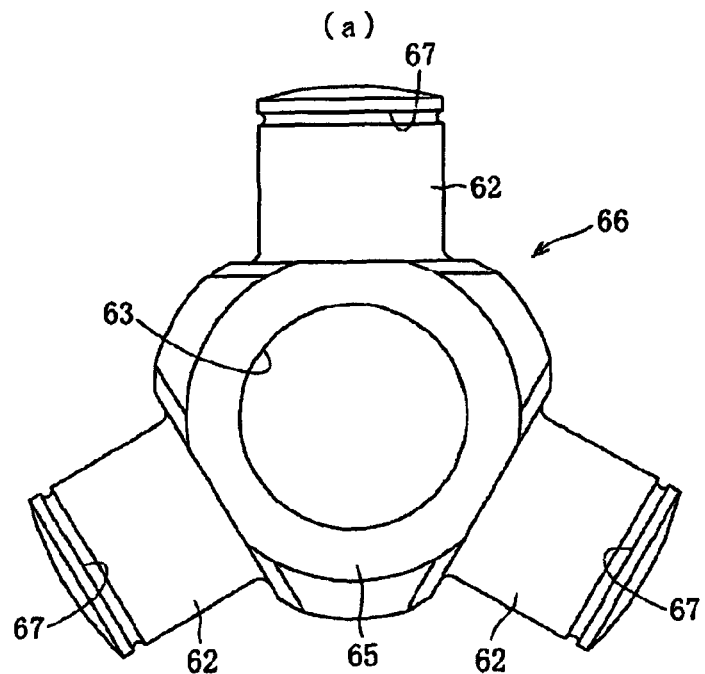
FIG. 15A are diagrams of an inner joint component of a tripod constant velocity universal joint using the recess-projection engagement configuration of the present invention; (a) is a front view; (b) is a cross-sectional view, and (c) is a cross-sectional view taken along line Z-Z in (b)
Figure 15A:
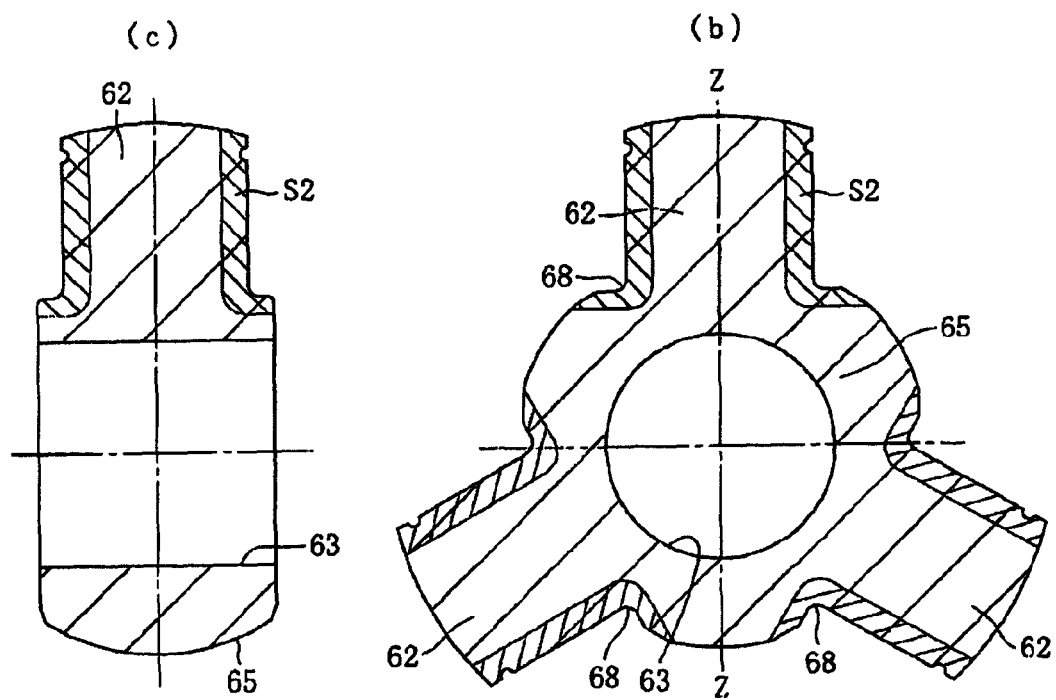
Figure 15B:
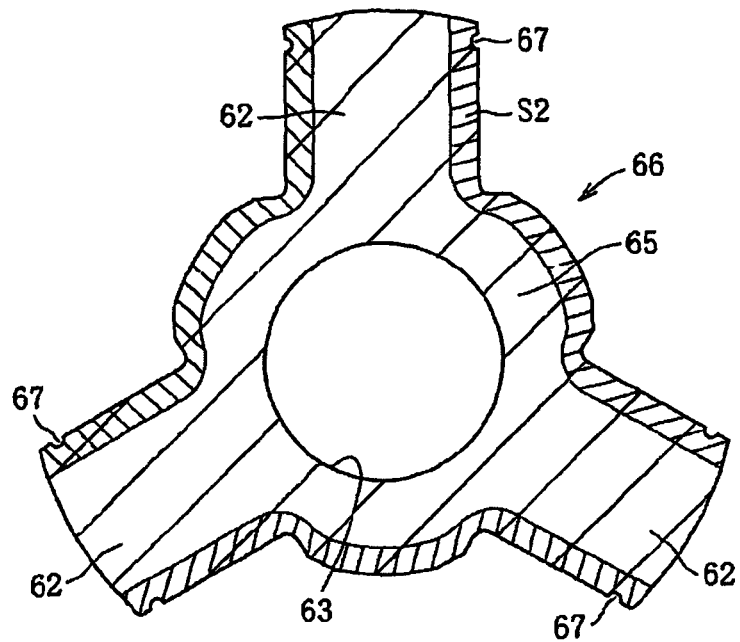
FIG. 15B is a cross-sectional view of a first variation example of the inner joint component of the tripod constant velocity universal joint.
Figure 15C:
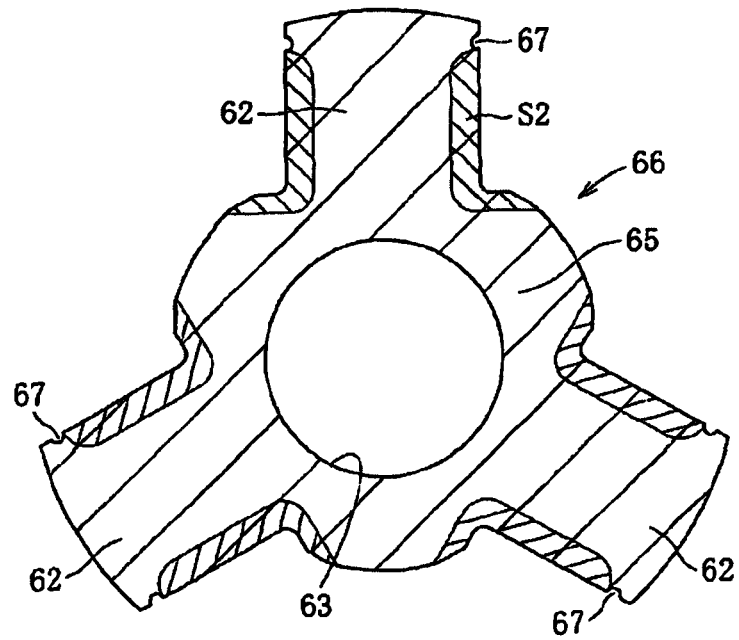
FIG. 15C is a cross-sectional view of a second variation example of the inner joint component of the tripod constant velocity universal joint.

The constant velocity universal joint can be a slide-type constant velocity universal joint in which a tripod-type trunnion, such as those shown in FIGS. 15(a) to (c), FIG. 15B, and FIG. 15C, is used as the inner joint component A tripod component 66 serving as the inner joint component includes a boss section 65 and leg shafts 62 that project in an outer diameter direction from the boss section 65 along the circumferential direction, at a 120 degree pitch. The shaft 5 is pressed into an axis hole 63 of the boss section 65. A roller (not shown) serving as a torque transmitting component is attached to the leg shaft 62. A circumferential direction groove 67 is formed on a tip section of the leg shaft 62. A stopper ring for stopping dislocation of the roller attached to the leg shaft 62 is set in the circumferential direction groove 67.

Therefore, the inner diameter surface of the axis hole 63 of the boss section 65 is an un-hardened section. The shaft 5 on the outer diameter surface of which the hardening process is performed and on the axial end section of which the spline 41 is formed, as shown in FIG. 4, is pressed into the axis hole 63 of the boss section 65. In the inner joint component in the tripod-type constant velocity universal joint as well, the hardened layer S2 is preferably provided on the outer surface as shown in FIGS. 15 A (b) and (c).

As a result of the press-fitting, the projections 35 configured by the projection tooth 41a of the spline 41 can form the recesses 36 that engage with the projections 35 on the inner diameter surface of the axis hole 63 of the boss section 65. In this case as well, the engagement contacting regions 38 of the projections 35 and the recesses 36 of the shaft 5 are in close contact over the whole region. Therefore, the tripod component 66 and the shaft 5 can be connected with high accuracy. A stable torque transmission can be performed.

Figure 16:
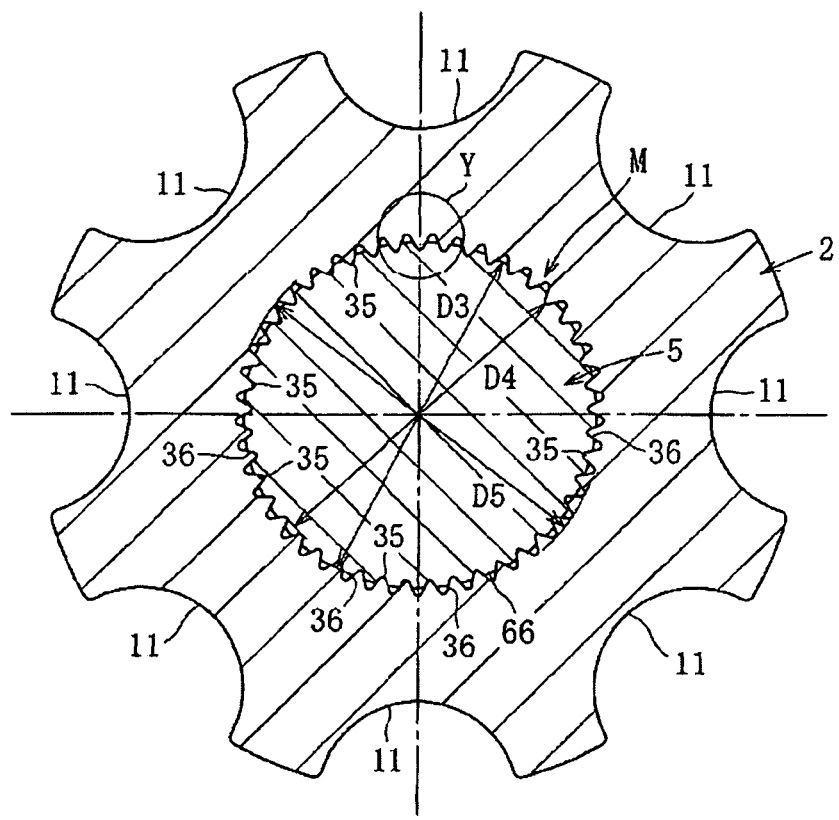
FIG. 16 is a cross-sectional view of another recess-projection engagement configuration.
Figure 17:
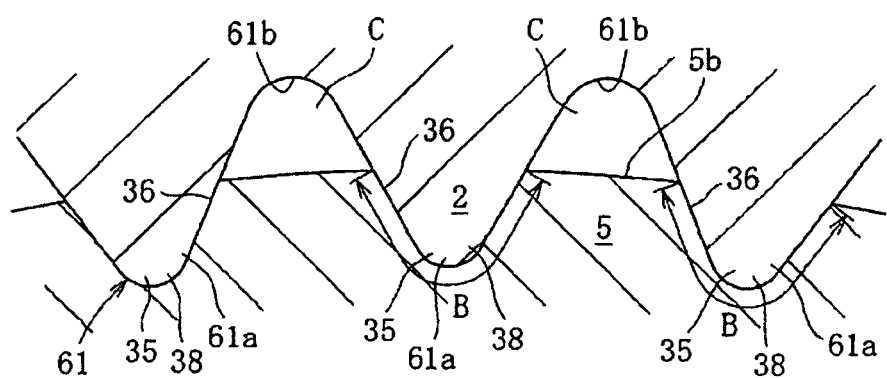
FIG. 17 is an enlarged view of a section Y m FIG. 16.

According to each embodiment described above, the spline 41 configuring the projections 35 on the shaft 5 side is formed. In addition, the hardening process is performed on the spline 41 of the shaft 5, and the inner diameter surface of the inner member 2 is un-hardened (raw material). On the other hand, according to another embodiment shown in FIG. 16 and FIG. 17, a spline 61 (formed by a projection line 61a and a recess line 61b) can be formed in which the hardening process is performed on the inner diameter surface of the axis hole 22 of the inner member. The hardening process is not performed on the shaft 5. The spline 61 can also be formed by various processing methods that have been public knowledge since the past, such as a broaching process, a cutting process, a pressing process, and an extraction process. As the thermoset processing, various heat treatments can be used, such as induction hardening, and carburizing and quenching In this case, the projecting direction intermediate region of the projection 35 corresponds to the position of the recess forming surface (outer diameter surface of the shaft 5) before the recess is formed. In other words, a minimum diameter (minimum inner diameter dimension of the projections 35) D4 of a circle connecting the peaks of the projections 35 that are the projection lines 61a of the spline 61 is set to be smaller than the outer diameter dimension D3 of the shaft 5. A minimum outer diameter dimension (inner diameter dimension of the axis hole inner diameter surface between projections) D5 of a circle connecting the bottoms of the recess lines 61b of the spline 61 is set to be greater than the outer diameter dimension D3 of the shaft 5. In other words, D4<D3<D5.

In this case, if the shaft 5 is pressed into the axis hole 22 of the inner member 2, the recesses 36 into which the projections 35 are fitted can be formed on the outer diameter surface 5b of the shaft 5 by the projections 35 on the inner member 2 side. As a result, an engaged state can be configured in which the engagement contacting regions 38 of the projections 35 on the inner member 2 side and the recesses 36 of the shaft 5 are in close contact over the whole region.

Here, the engagement contacting regions 38 of the projections 35 and the recesses 36 of the shaft 5 are region B shown in FIG. 17(b). The region B is a region from the middle of the slope of the projection 35 to the peak in the cross-section. A gap C is formed between projections 35 adjacent in the circumferential direction. The gap C is formed closer to the outer diameter side than the outer diameter surface of the shaft 5.

In this case as well, the protruded sections are formed by the press-fitting. Therefore, the pocket sections for housing the protruded sections are preferably provided. Unlike that shown in FIG. 10, the protruded sections are formed on the shaft side. Therefore, the pocket sections are provided on the inner member 2 side.

Even when the projections 35 of the recess-projection engagement configuration M are formed on the inner member 2 side in this way, a shoulder section can be provided on an end section of the shaft 5. The shoulder section performs centering when the outer diameter dimension of the shaft 5 is pressed into the inner member 2. As a result, a high accuracy press-fitting can be performed. In addition, a projection recess in a saw-tooth shape or the like that provides a dislocation stopping function can be provided on the inner member 2 side. Even when the hardened surface S1 is not shown in any of the above-described inner members, the hardened surface S1 is preferably provided in a manner similar to that in FIG. 2 and FIG. 3.

Figure 18:
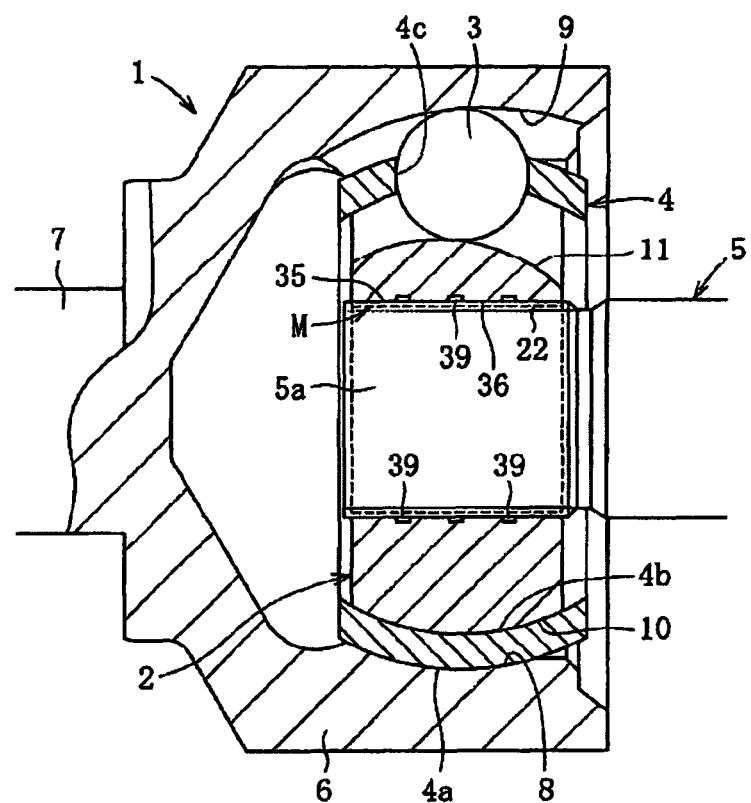
FIG. 18 is a cross-sectional view of a constant velocity universal joint using a variation example of the recess-projection engagement configuration.
Figure 19:
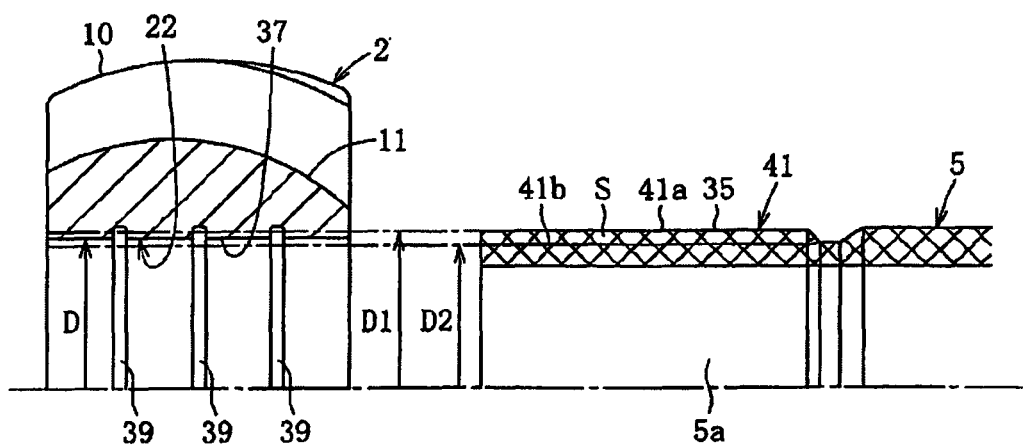
FIG. 19 is a cross-sectional view of the recess-projection engagement configuration in an exploded state.
Figure 20:
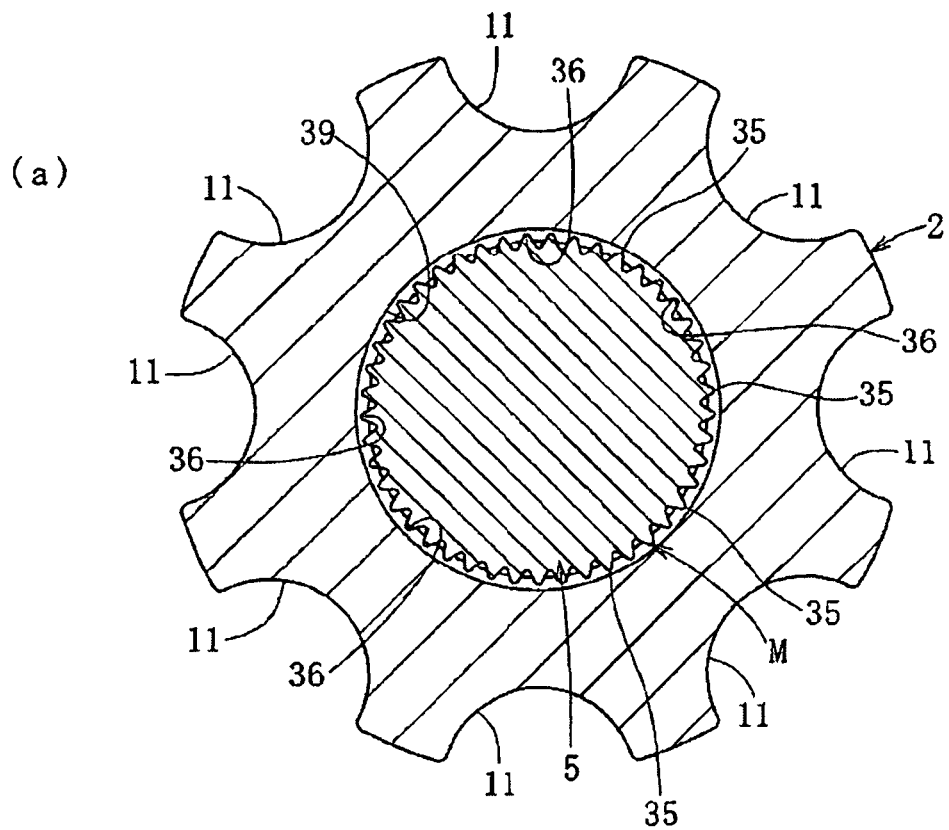
FIG. 20 are diagrams of the recess-projection engagement configuration of the constant velocity universal joint; (a) is an enlarged cross-sectional view, and (b) is an enlarged view of main components in (a)
Figure 20:
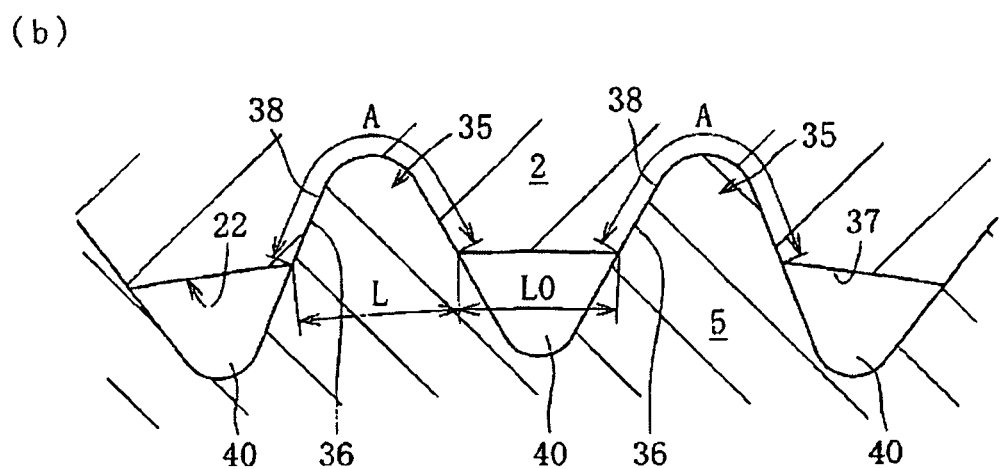
Figure 21:
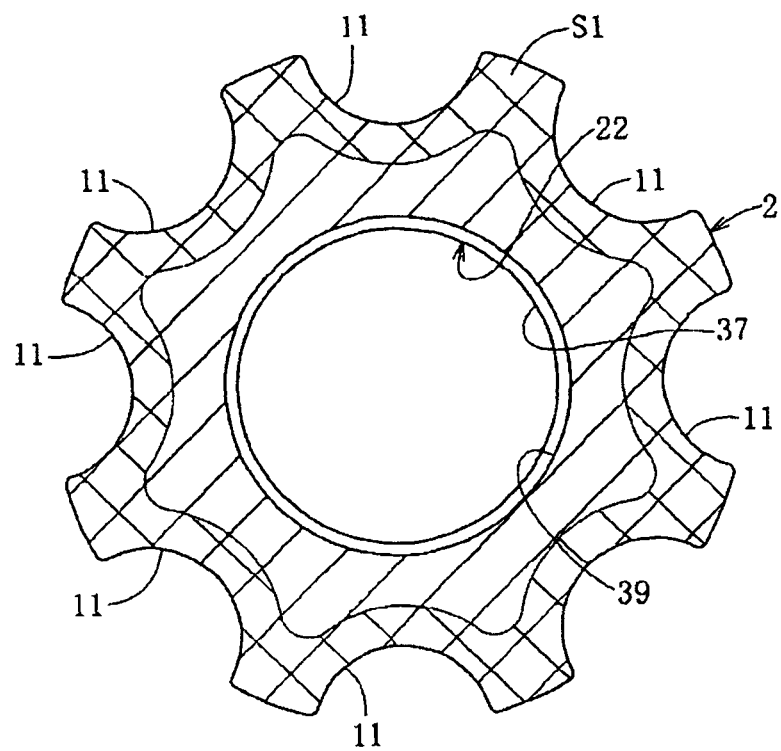
FIG. 21 is a cross-sectional view of a recess groove on the inner member of the constant velocity universal joint.

Next, variation embodiments of the present invention will be described with reference to FIG. 18 to FIG. 36. According to any variation embodiment, as shown in FIGS. 18 and 19 for example, a plurality of recess grooves 39 (three grooves according to the embodiment) running along the circumferential direction are disposed on the inner diameter surface 37 of the axis hole 22 of the inner member 2 at a predetermined pitch along the axial direction. A depth of the recess groove 39 is set to be deeper than a depth of the recess 36 formed on the inner diameter surface 37 of the axis hole 22.

Any region in a projecting direction of the projection 35 (projecting direction intermediate section in the diagram) corresponds with the position of the recess forming surface before the recess is formed. Each projection 35 has a triangular (sloped) cross-section having a projection, arc-shaped peak. The engagement contacting regions 38 of each projection 35 and recess 36 of the inner member 2 are region A shown in FIG. 20(b). The region A is a region from the middle of the slope to the peak in the cross-section of the projection 35. The gap 40 is formed between projections 35 adjacent in the circumferential direction. The gap 40 is formed closer to the inner diameter side than the inner diameter surface 37 of the inner member 2. Rather than the projection direction intermediate section of all projections 35 corresponding to the position of the recess forming surface before the recess is formed, some projections 35 can correspond thereto.

Figure 22:
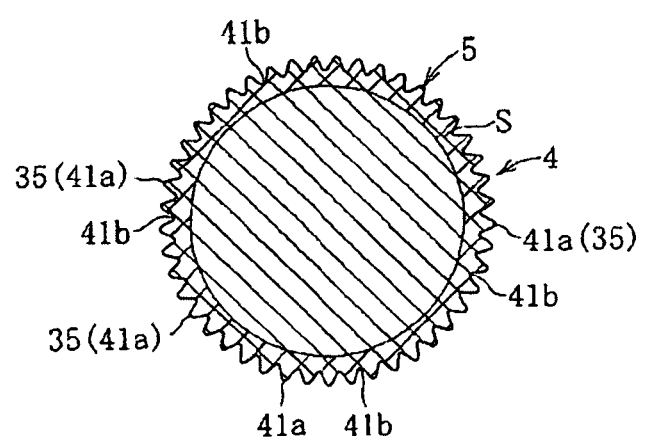
FIG. 22 is a cross-sectional view of the shaft connected to the constant velocity universal joint.

As shown in FIG. 19 and FIG. 22, the thermoset processing is performed on the outer diameter section of the end section 5a of the shaft 5. The spline 41 is formed including the projection 41a and the recess 41b running along the hardened layer S in the axial direction. Therefore, the projection 41a of the spline 41 is hardening-processed. The projection 41a becomes the projection 35 of the recess-projection engagement configuration M. At this time, the inner diameter surface 37 of the axis hole 22 of the inner member 2 is an un-hardened section on which the thermoset processing has not been performed. In FIG. 19 and FIG. 22, a cross-hatched section indicates the hardened layer S. A hardness difference between the hardened layer S and the un-hardened section of the inner diameter surface 37 of the axis hole 22 of the inner member 2 is 30 points or more in HRC. The module of the spline 41 of the shaft 5 is small teeth of 0.5 or less.

When the shaft 5 is pressed into the inner member 2, material is pushed out from the recesses 36 formed by the projections 35. The protruded sections 45 (see FIG. 27 and the like) are formed. The protruded section 45 is the material of an amount of the volume of the recess 36 into which the projection 35 is fitted (engaged). The protruded section 45 is configured by material that is pushed out from the formed recesses 36, material that is cut to form the recesses 36, both material that is pushed out and material mat is cut, and the like.

Because the recess grooves 39 are formed on the inner diameter surface 37 of the axis hole 22 of the inner member 2, when the recesses 36 are formed by the projections 35, the recesses 36 are intermittent, without being continuous in a length direction (axial direction). Therefore, the protruded sections (pushed-out sections) 45 are cut at intermittent sections (recess groove 39) of the recesses 36. Therefore, resistance that pushes the protruded sections (pushed-out sections) 45 is reduced. The press-fitting load is reduced. Because the press-fitting load is reduced, an overall length of the recess 36 can be increased. An engagement length of the recess-projection engagement configuration M can be increased.

Figure 23:
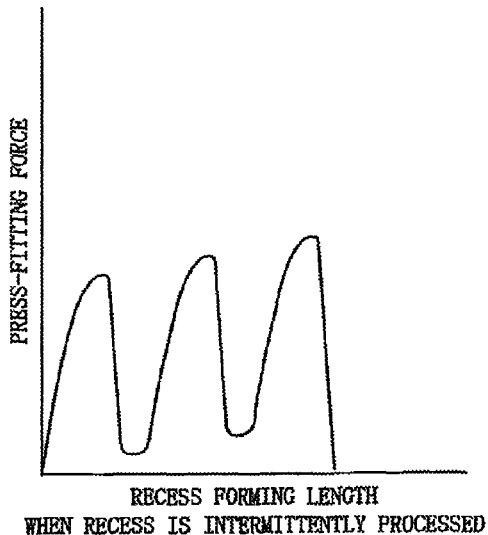
FIG. 23 is a graph of a relation between a recess forming length and a press-fitting force when a recess is intermittently processed.
Figure 24:
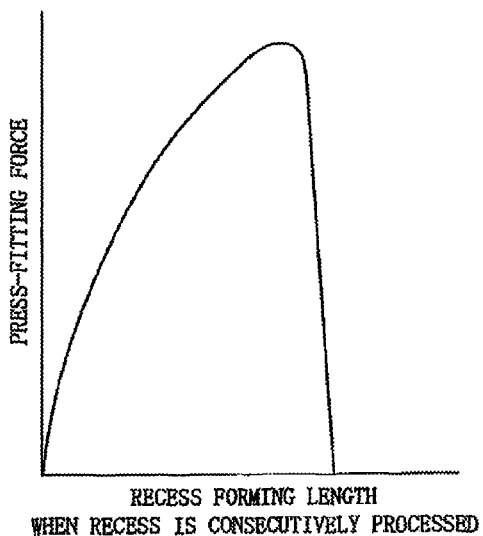
FIG. 24 is a graph of a relation between a recess forming length and a press-fitting force when a recess is continuously processed.

In other words, when the recesses 36 are intermittent, as shown in FIG. 23, the press-fitting force (load) decreases at the recess groove 39. However, when the recesses 36 are not intermittent, as shown in FIG. 24, the press-fitting force increases as the recess forming length increases.

Figure 25:
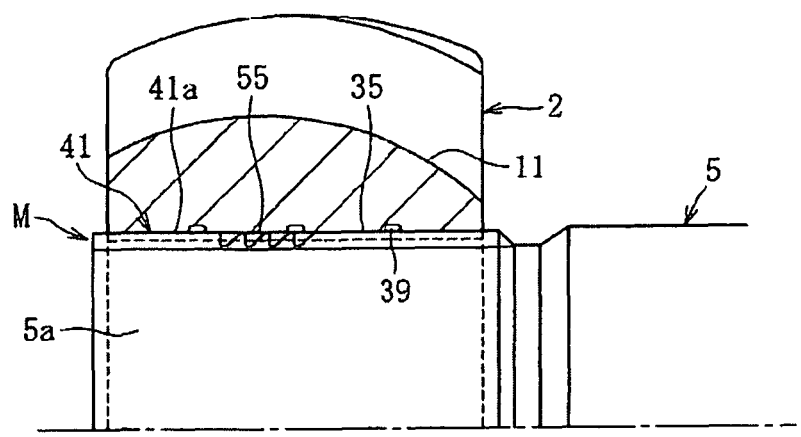
FIG. 25 is a cross-sectional view of a recess-projection engagement configuration according to another variation embodiment of the present invention.

Next, FIG. 25 shows another embodiment. In the recess-projection engagement configuration M, the projection recess 55 running along the axial direction is formed on a portion of the projection 35 of the shaft 5, namely the projection 41a of the spline 41, in the axial direction. In this case, the projection recess 55 is formed in a saw-tooth shape running along the axial direction. In this case, the cross-section of the projection (projection tooth) 55a in the axial direction is a right triangle of which the shaft end surface side is the angled surface. According to this embodiment as well, the recess groove 39 is formed on the inner diameter surface 37 of the axis hole 22 of the inner member 2.

Figure 26:
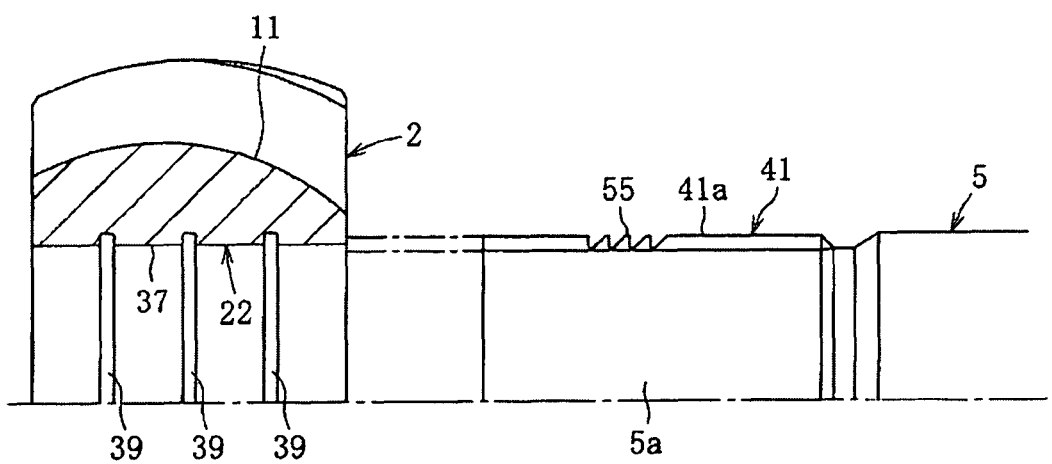
FIG. 26 is a cross-sectional view of FIG. 25 in an exploded state.

As shown in FIG. 26, when the axial center of the inner member 2 and an axial center of the shaft 5 are aligned and the shaft 5 including the projection recess 55 is pressed into the axis hole 22 of the inner member 2, the projections 35 on the shaft 5 side form the recesses 36 on the inner member 2. In this case, the projection recess 55 wedges into the bottom section of the recesses 36 formed on the inner member 2 side. In other words, the axis hole 22 of the inner member 2 that expands in diameter during press-fitting decreases in diameter such as to return to an original state after the press-fitting is completed. Therefore, when a description is given with reference to FIG. 8, the pressing force (diameter reduction force) works on the projection recess 55 from the inner diameter surface side of the axis hole 22 of the inner member 2, as shown by the arrow. The projections 55a of the projection recess 55 wedge into the inner diameter surface of the axis hole 22 of the inner member 2.

Figure 27:
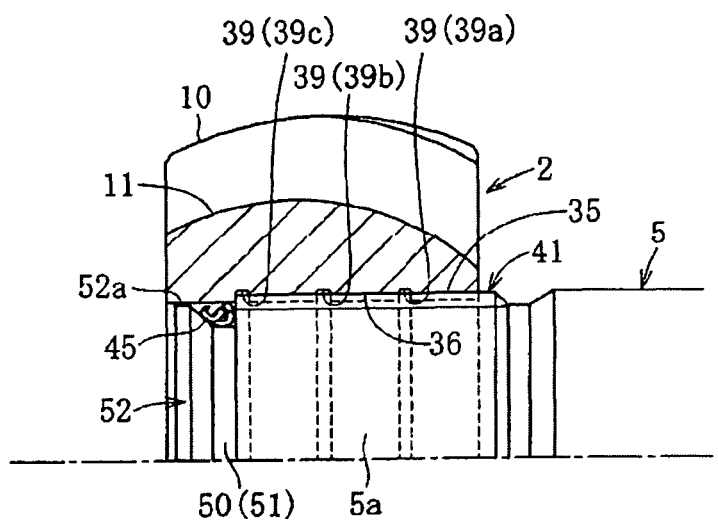
FIG. 27 is a cross-sectional view of a recess-projection engagement configuration according to still another variation embodiment of the present invention.
Figure 28:
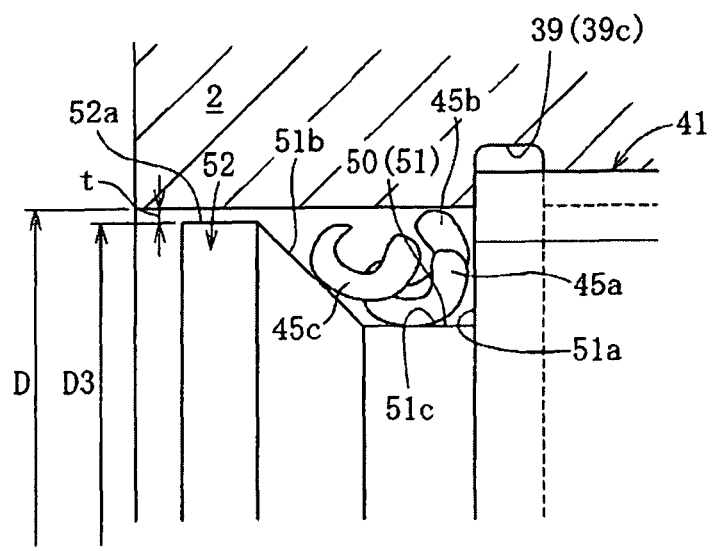
FIG. 28 is an enlarged cross-sectional view of main components of the recess-projection engagement configuration in FIG. 27.

According to still another embodiment shown in FIG. 27, the pocket section 50 that houses the protruded section 45 is provided on the shaft 5. In other words, the pocket section 50 is formed by the circumferential direction groove 51 being formed on the axial end edge of the spline 41 of the shaft 5. As shown in FIG. 28, the side wall 51a of the circumferential direction groove 51 on the spline 41 side is a flat surface perpendicular to the axial direction. The side surface 51b on the counter-spline side is a tapered surface of which the diameter expands from the groove bottom 51c towards the counter-spline side.

The disk-shaped shoulder section 52 for centering is provided closer to the counter-spline side than the side surface 51b. An outer diameter dimension D3 of the shoulder section 52 is set to be the same as the hole diameter of the axis hole 22 to slightly smaller than the hole diameter D of the axis hole 22. In this case, the minute gap t is provided between the outer diameter surface 52a of the shoulder section 52 and the inner diameter surface 37 of the axis hole 22.

Figure 29:
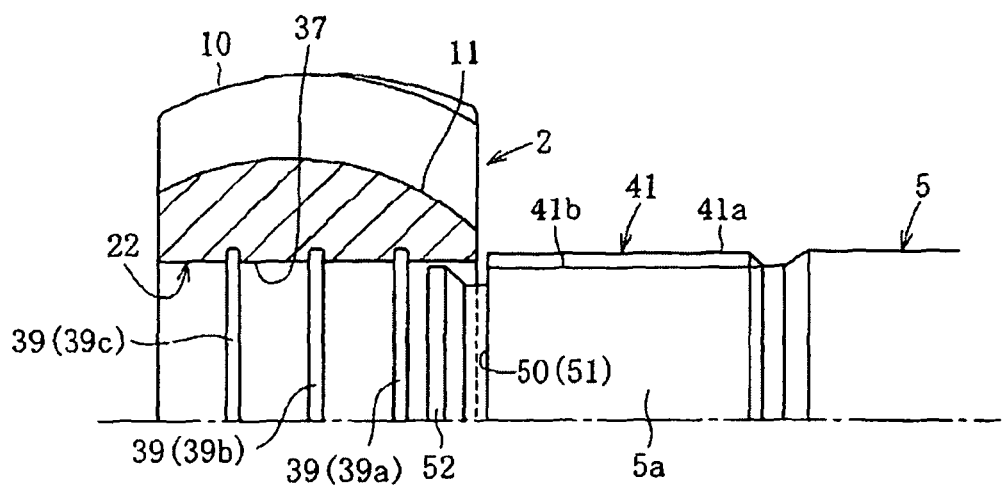
FIG. 29 is a cross-sectional view of the recess-projection engagement configuration in FIG. 27 in an assembled state.
Figure 30:
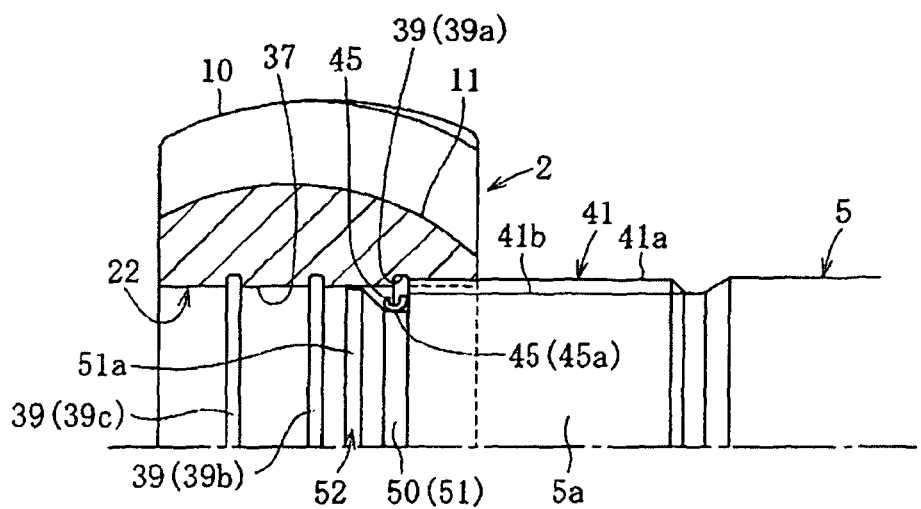
FIG. 30 is a cross-sectional view of the recess-projection engagement configuration in FIG. 27 in an assembled state.
Figure 31:
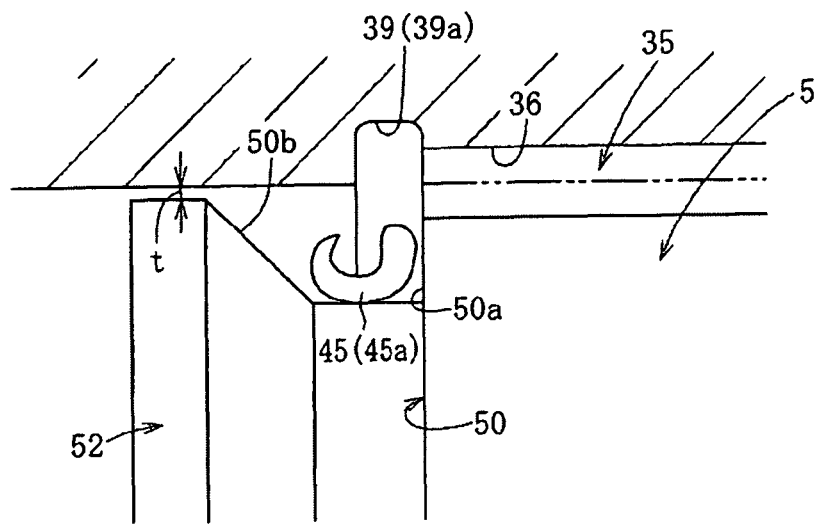
FIG. 31 is an enlarged cross-sectional view of main components of the recess-projection engagement configuration in FIG. 27 in an assembled state.
Figure 32:
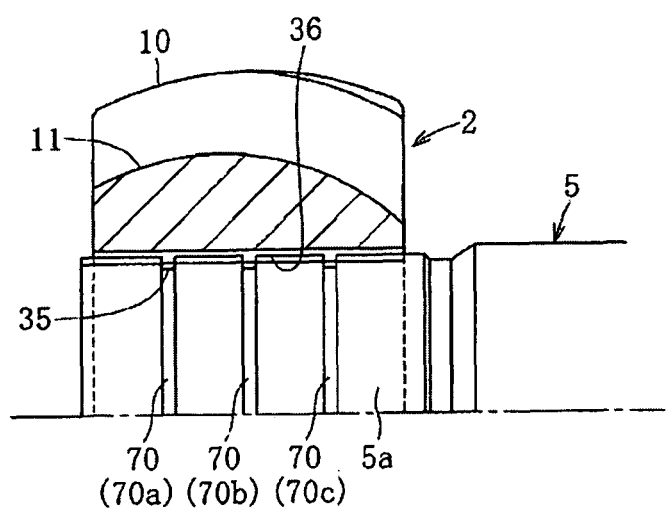
FIG. 32 is a cross-sectional view of a recess-projection engagement configuration according to still another variation embodiment of the present invention.
Figure 33:
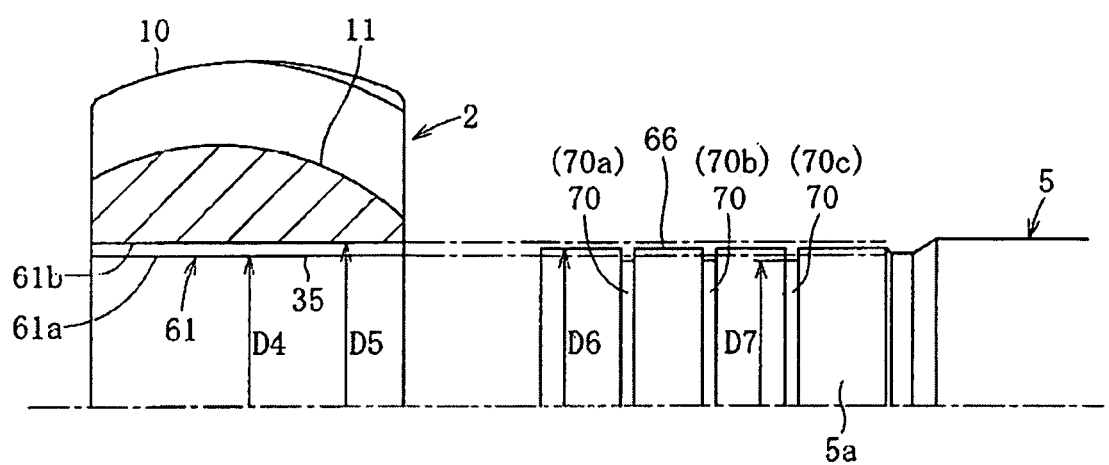
FIG. 33 is a crass-sectional view of the recess-projection engagement configuration in FIG. 32 in an assembled state.

Even in the shaft 5 shown in FIG. 27, as shown in FIG. 29, when the axial center of the inner member 2 and the axial center of the shaft 5 are aligned and the shaft 5 is pressed into the axis hole 22 of the inner member 2, the projections 35 on the shaft 5 side forms the recesses 36 on the inner member 2 side. At this time, as shown in FIG. 30 and FIG. 31, the formed protruded section 45 is first cut at a recess groove 39a on a press-fitting starting end side. A cut piece 45a thereof is housed in the pocket section 50. Subsequently, when press-fitting is further performed, the protruded section 45 is cut at a recess groove 39b at an axial direction center. A cut piece 45b (see FIG. 28) thereof is housed in the pocket section 50. As a result of the press-fitting being further performed, the protruded section 45 is cut at a recess groove 39c at a counter-press-fitting starting end side. A cut piece 45c (see FIG. 28) thereof is housed in the pocket section 50. Ultimately, as shown in FIG. 28, the protruded section 45 from the press-fitting starting end side to the recess groove 39a near the starting end, the protruded section 45 from the recess groove 39a to the recess groove 39b at the axial direction center, and the protruded section 45 from the recess groove 39b at the axial direction center to the recess groove 39c on the counter-press-fitting starting end side are housed in the pocket section 50.

In this way, as a result of the pocket section 50 housing the protruded sections 45 formed as a result of recess formation by press-fitting being provided as described above, the protruded sections 45 can be held (maintained) within the pocket section 50 and do not slip into the constant velocity universal joint. In other words, the protruded sections 45 can remain housed within the pocket section 50. The protruded section 45 removal operation is not required to be performed. A number of assembly operations can be reduced. Assembly workability can be improved and cost can be reduced.

As a result of the shoulder section 52 for centering with the axis hole 22 of the inner member 2 being provided on the counter-projection side of the pocket section 50, the protruded sections 45 within the pocket section 50 do not fly out towards the shoulder section 52 side. The protruded sections 45 are more stably housed. Moreover, because the shoulder section 52 is for centering, the axis section can be pressed into the axis hole 22 of the inner member 2 while preventing center misalignment. Therefore, the inner member 2 and the shaft 5 can be connected with high accuracy. A stable torque transmission can be performed.

Because the shoulder section 52 is for centering during press-fitting, the outer diameter dimension D3 thereof is preferably set to be about slightly smaller than the hole diameter of the inner member 2. In other words, if the outer diameter dimension of the shoulder section 52 is the same as the hole diameter of the inner member 2 or greater than the hole diameter of the inner member 2, the shoulder section 52 itself is pressed into the axis hole of the inner member 2. When the outer diameter dimension of the shoulder section 52 is excessively smaller than the hole diameter of the axis hole, the shoulder section 52 does not function as that for centering. Therefore, the minute gap t between the outer diameter surface 52a of the shoulder section 52 and the inner diameter surface of the axis hole is preferably set to about 0.01 mm to 0.2 mm.

Figure 34:
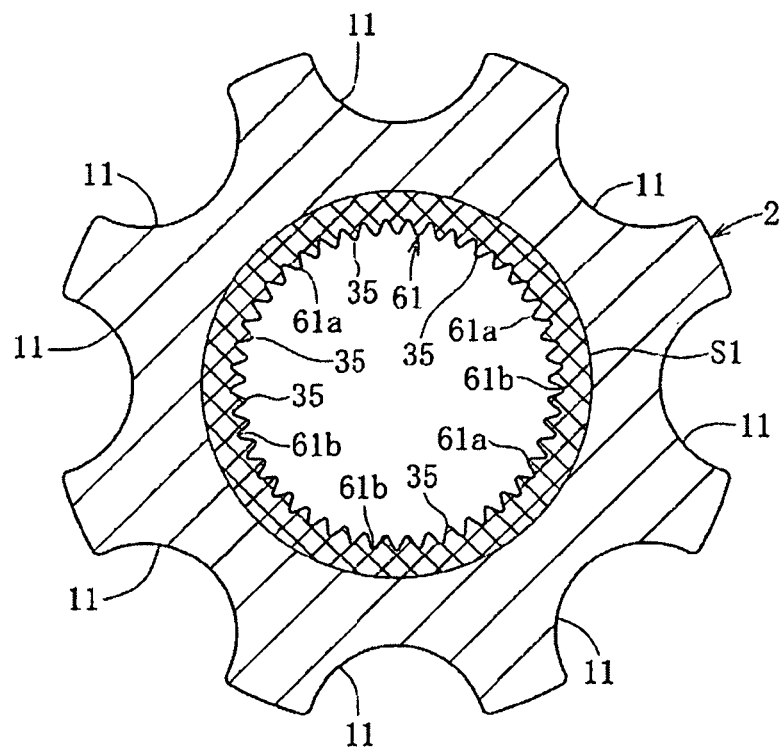
FIG. 34 is a cross-sectional view of an inner member configuring the recess-projection engagement configuration in FIG. 32.

According to each embodiment described above, the spline 41 configuring the projections 35 on the shaft 5 side is formed. In addition, the hardening process is performed on the spline 41 of the shaft 5, and the inner diameter surface of the inner member 2 is un-hardened (raw material). On the other hand, according to an embodiment shown in FIG. 32 and FIG. 33, as shown in FIG. 34, the spline 63 (formed by the projection line 61a and the recess line 61b) can be formed in which the hardening process is performed on the inner diameter surface of the axis hole 22 of the inner member. The hardening process is not performed on the shaft 5. The spline 61 can also be formed by various processing methods that have been public knowledge since the past, such as a broaching process, a cutting process, a pressing process, and an extraction process. As the thermoset processing, various heat treatments can be used, such as induction hardening, and carburizing and quenching. In FIG. 34, a cross-hatched section on the inner diameter side of the inner member 2 indicates the hardened layer S1.

The projecting direction intermediate region of the projection 35 corresponds to the position of the recess forming surface (outer diameter surface of the shaft 5) before the recess is formed, in other words, a minimum diameter (minimum inner diameter dimension of the projections 35) D4 of a circle connecting the peaks of the projections 35 that are the projection lines 61a of the spline 61 is set to be smaller than an outer diameter dimension D6 of the shaft 5. A minimum outer diameter dimension (inner diameter dimension of the axis hole inner diameter surface between projections) D5 of a circle connecting the bottoms of the recess lines 61b of the spline 61 is set to be greater than the outer diameter dimension D5 of the shaft 5. In other words, D4<D6<D5.

In addition, a plurality of recess grooves 70 (three grooves in FIGS. 32 and 33) are formed on the outer diameter surface (spline forming section) of the shaft 5 along the circumferential direction. A groove bottom diameter D7 of a recess groove 70 is set to be smaller than the minimum diameter (minimum inner diameter dimension of the projections 35) D4 of the circle connecting the peaks of the projections 35.

Figure 35:
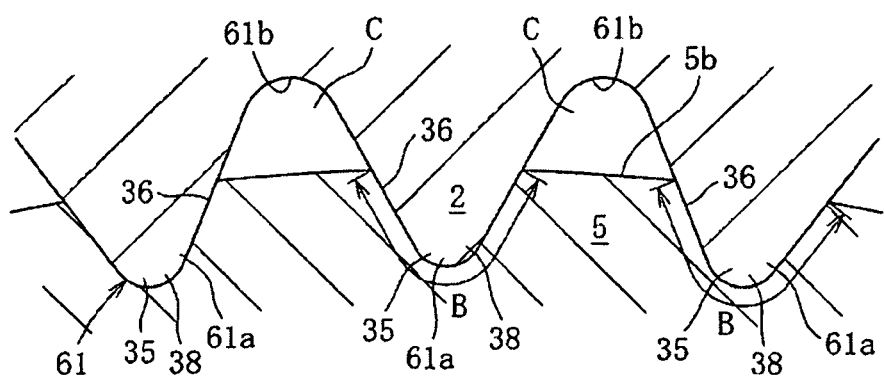
FIG. 35 is a cross-sectional view of main components of the recess-projection engagement configuration in FIG. 32.

Here, the engagement contacting regions 38 of the projections 35 and the recesses 36 of the shaft 5 are region B shown in FIG. 35. The region B is a region from the middle of the slope to the peak in the cross-section. The gap C is formed between projections 35 adjacent in the circumferential direction. The gap C is formed closer to the outer diameter side than the outer diameter surface of the shaft 5.

Therefore, as shown in FIG. 34, as a result of the projections 35 being provided on the axis hole 22 of the inner member 2 and the shaft 5 being pressed into the axis hole 22 of the inner member 2, even when the recesses 36 are formed on the outer diameter surface of the shaft 5 by the projections 35 of the inner member 2, a gap causing backlash in a radial direction and the circumferential direction is not formed. As a result, operational effects similar to those according to the first embodiment in FIG. 1, described above, such as all engagement regions contributing to rotational torque transmission and stable rotational torque transmission being made possible, can be achieved.

The protruded section is formed by press-fitting in a similar manner to that according to the above-described embodiment. However, because the recess grooves 70 are formed on the outer diameter surface of the shaft 5, first, the protruded section from a tip edge of the shaft 5 to the foremost recess groove 70 is cut at this recess groove 70. Then, the protruded section from the foremost recess groove 70 to the middle recess groove 70 is cut at this recess groove 70. The protruded section from the middle recess groove 70 to the proximal recess groove 70 is cut at this recess groove 70.

Therefore, the protruded sections are intermittently formed. Operational effects similar to those when the recess grooves 39 are formed on the inner member 2 side can be achieved. A pocket section housing the protruded sections is preferably provided. Because the protruded sections are formed on the shaft side, the pocket section is provided on the inner member 2 side.

Even when the recess and projection engagement configuration M is intermittently formed, the shoulder section can be provided on the end section of the shaft 5. The shoulder section performs centering when the outer diameter dimension of the shaft 5 is pressed into the inner member 2. As a result, a high accuracy press-fitting can be performed. In addition, a projection recess in a saw-tooth shape or the like that provides a dislocation stopping function can be provided on the inner member 2 side.

Figure 36:
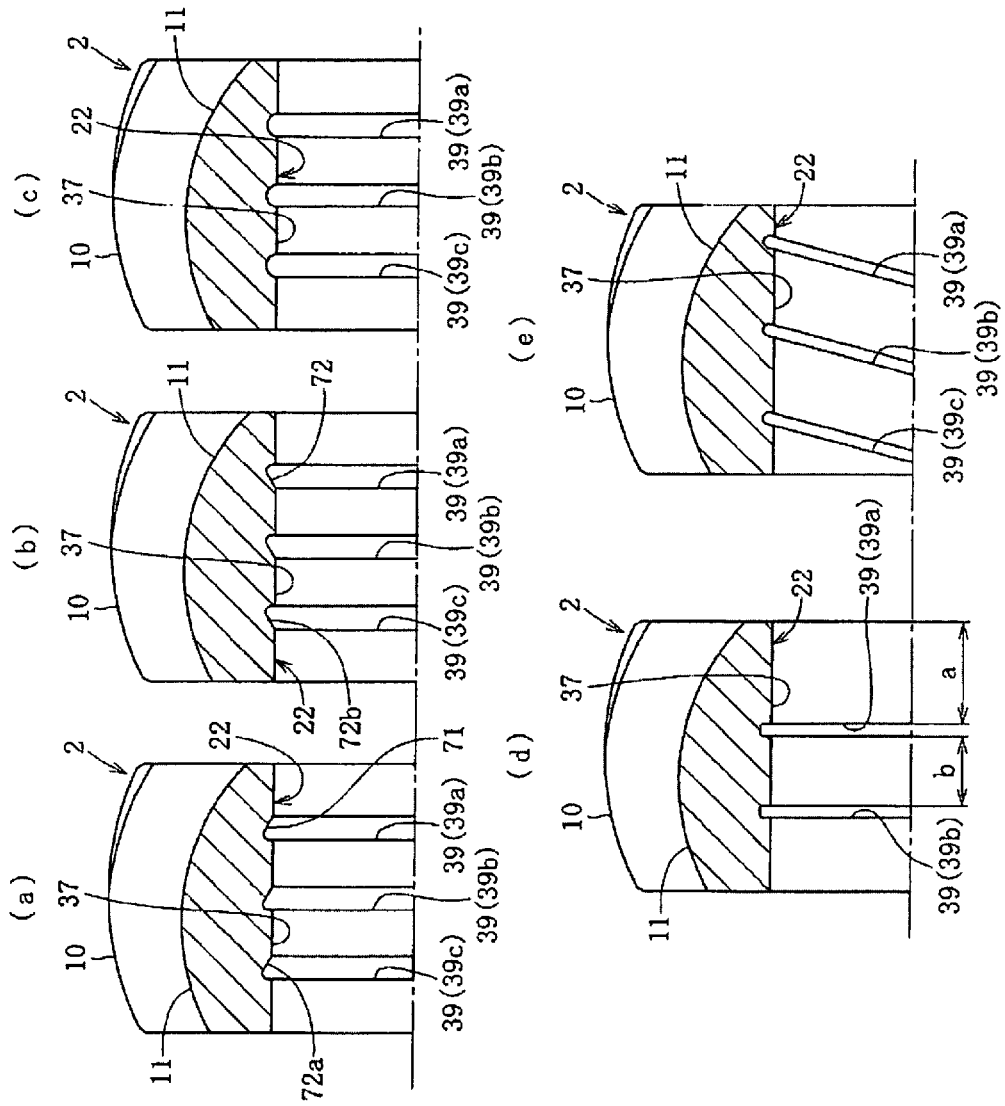
FIG. 36 is a cross-sectional view of a variation example of a recess groove.

As the recess grooves 39 formed on the inner diameter surface 37 of the axis hole 22 of the inner member 2, grooves in various shapes shown in FIGS. 36(*a*), (*b*), (*c*), (*d*), and (*e*) can be used. FIG. 36(*a*) shows a groove including a tapered section 72*a* of which the groove bottom becomes deeper from the press-fitting starting end side towards the counter-starting end side. FIG. 36(*b*) shows a groove including a tapered section 72*b* of which the groove bottom becomes shallower from the press-fitting starting end side towards the counter-starting end side. FIG. 36(*c*) shows a groove of which the groove bottom is semicircular.

In FIGS. 36(*d*) and (*e*), in a similar manner to that in FIG. 1 and the like, the cross-sectional shape of the recess groove 39 is rectangular. However, in FIG. 36(*d*), the number of recess grooves 39 is two grooves. When a length from the press-fitting starting end to the recess groove 39*a* on the press-fitting starting end side is a and a length from the recess groove 39*a* to another recess groove 39*b* is b, a>b. In addition, in FIG. 36(*e*), three recess grooves 39*a*, 39*b*, and 39*c* are at an angle to the axial center.

Therefore, even when the recess grooves 30 are of the various shapes shown in FIGS. 36(*a*), (*b*), (*c*), (*d*), and (*e*), when the projections 35 form the recesses 36, the recesses 36 are intermittent, without continuing along the length direction (axial direction). Therefore, the protruded sections (pushed-out sections) 45 formed when the shaft 5 is pressed into the axis hole 22 of the inner member 2 are cut at the intermittent sections of the recesses 36. Operational effects similar to those in FIG. 1, described above, can be achieved. In particular, as shown in FIG. 36(*d*), as a result of the length to the recess groove 39*a* on the press-fitting starting end side being long, spline strength (engagement strength) can be ensured at a range that is most easily twisted and at which stress is concentrated (a range from the press-fitting starting end to the recess groove 39*a* on the starting end side).

In addition, even when the recess grooves are the recess grooves 70 formed on the shaft 5 side, the grooves of the various shapes shown in FIGS. 36(*a*), (*b*), (*c*), (*d*), and (*e*) can be used.

The recess grooves 39 and 70 can be formed by, for example, turning. Therefore, the groove shape is a shape cut by an ordinary grooving bite. The groove shape can be a copying shape (from either side in the axial direction) such that a recess groove forming surface (the inner diameter surface 37 of the inner member 2 or the outer diameter surface 5*b* of the shaft 5) and a recess groove processing can be cut through a single process. The number of recess grooves 39 and 70 can be increased and decreased arbitrarily. According to the above-described embodiments, the recess grooves 39 and 70 are separate. However, the recess grooves 39 and 70 can be formed continuously in a spiral form.

In any of the above-described constant velocity universal joints, constituent elements including the outer member 1, the inner member 2, the balls 3, and the cage 4 can be mounted by random matching, and the track grooves 9 of the outer member 1 and the track grooves 11 of the inner member 2 can be formed by cold forging finish.

In other words, the outer member 1 and the inner member 2 of which the track grooves 9 and 11 are formed by cold forging finish are formed by random matching in which combinations are arbitrarily made without selected combining being performed in which, from among a large number of outer members 1, inner members 2, balls 3, and cages 4, constituent elements including the outer member 1, the inner member 2, the balls 3, and the cage 4 can be selected and combined such that PCD gap and the like fall within a range of defined values.

As a result of each constituent element being combined by random matching and either one of the track grooves 9 of the outer member 1 and the track grooves 11 of the inner member 2 being formed by cold forging finish in this way, only cold forging finish is performed. Grinding finish after turning and heat treatment become unnecessary. Therefore, cost reduction of the constant velocity universal joint can be achieved.

The constituent elements including the outer member 1, the inner member 2, the balls 3, and the cage 4 can be selected and mounted such that the PCD gap and the like fall within the range of defined values. In this case, the PCD gap and the like can easily fall within the range of defined values. Backlash between each constituent element can be kept to a minimum required amount.

Here, in the recess-projection engagement configuration M between the inner diameter axis hole 22 of the inner member 2 and the shaft 5, in a constant velocity universal joint in which a gap forming backlash in the radial direction and the circumferential direction is not formed and that includes the outer member 1 and the inner member 2 of which the track of at least either one is cold forging finished, described above, the PCD gap of the ball tracks formed by the track grooves 9 of the outer member 1 and the track grooves 11 of the inner member 2 that work together with the track grooves 11 is preferably defined as being from −0.02 to +0.3 mm. As a result, the backlash between each constituent element, including the outer member 1, the inner member 2, the balls 3, and the cage 4, can be kept to a minimum required amount.

Figure 39:
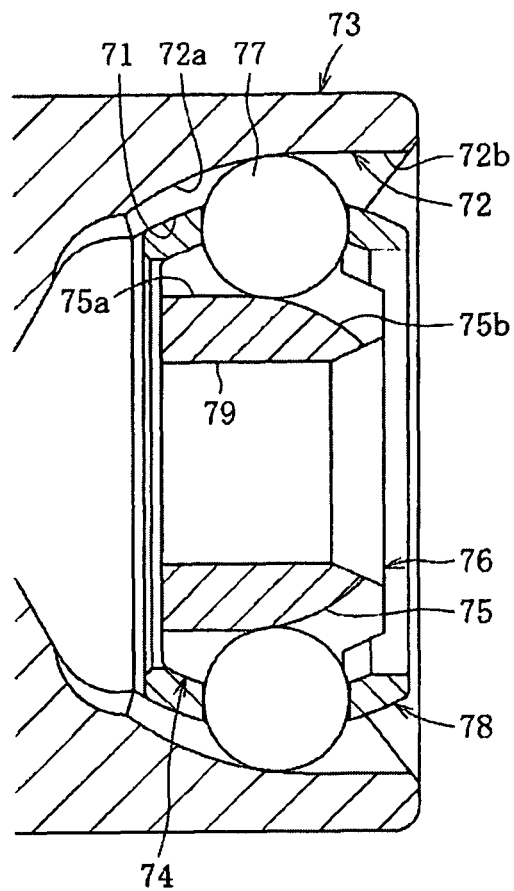
FIG. 39 is a vertical cross-sectional view of an undercut-free constant velocity universal joint.
Figure 40:
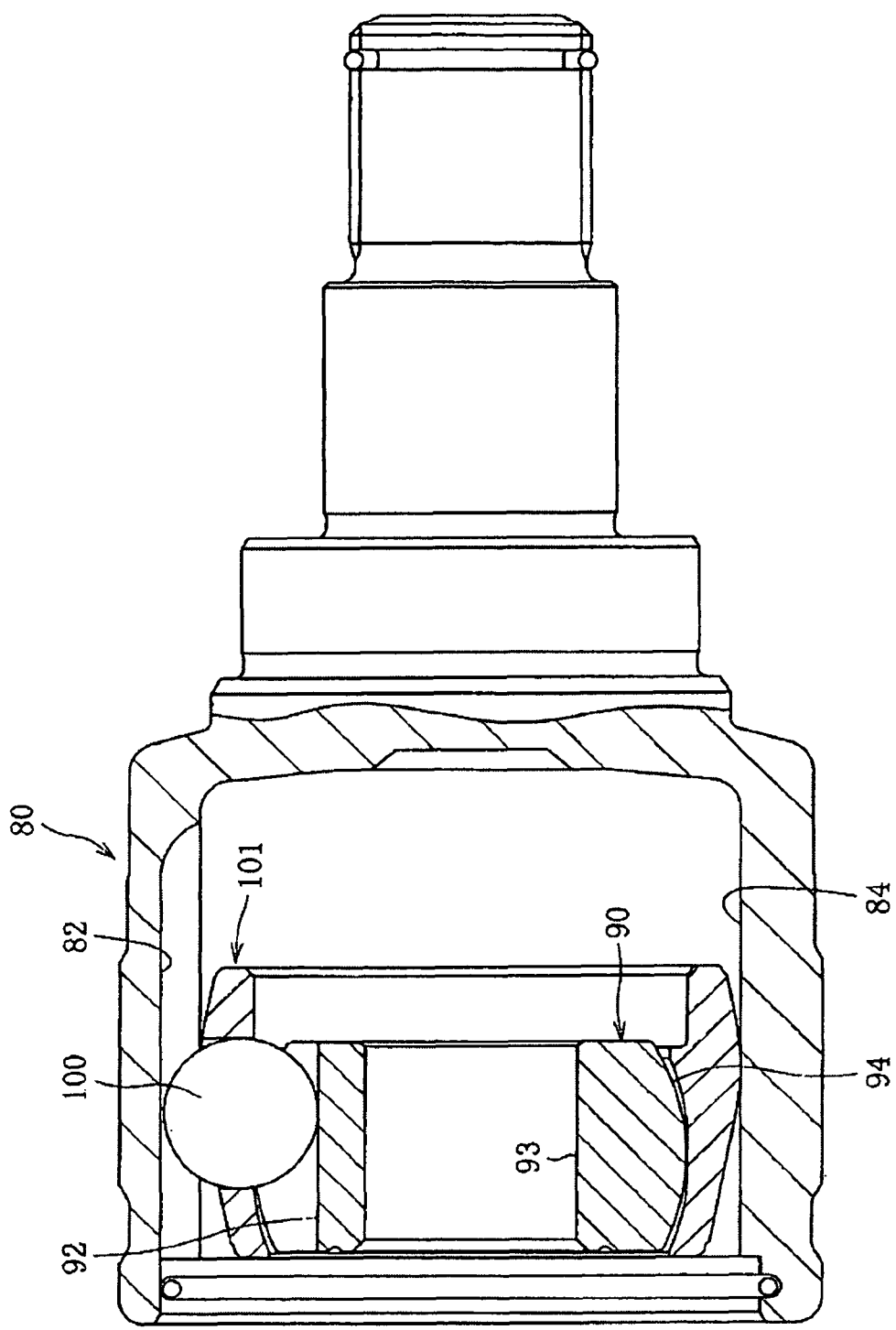
FIG. 40 is a vertical cross-sectional view of a DOJ-type constant velocity universal joint.
Figure 41:
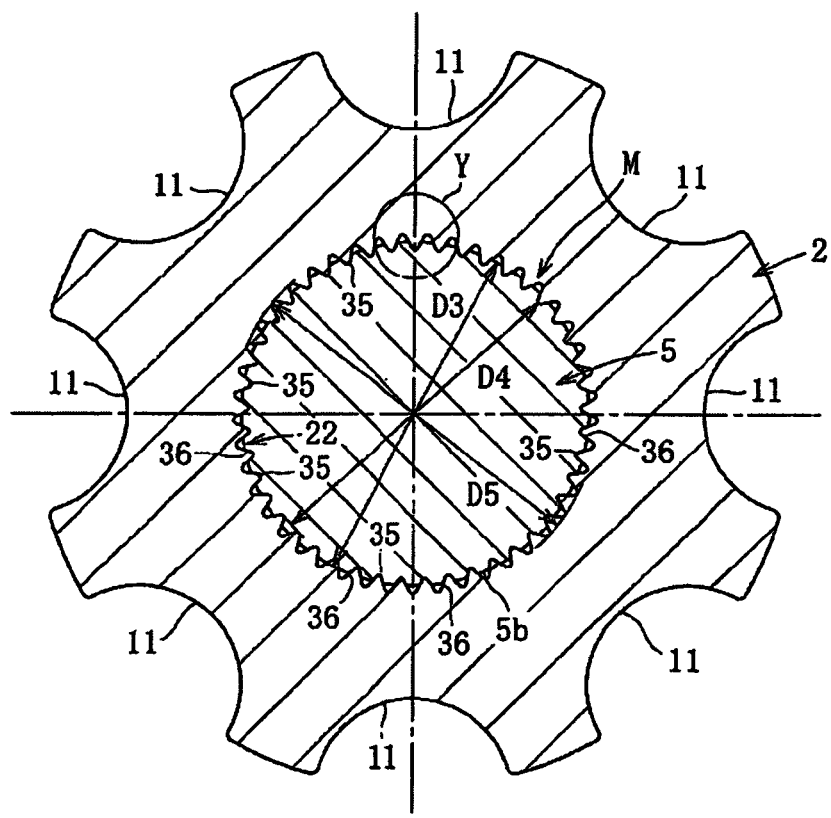
FIG. 41 is a cross-sectional view of a sixth variation example of the recess-projection engagement configuration.
Figure 42:
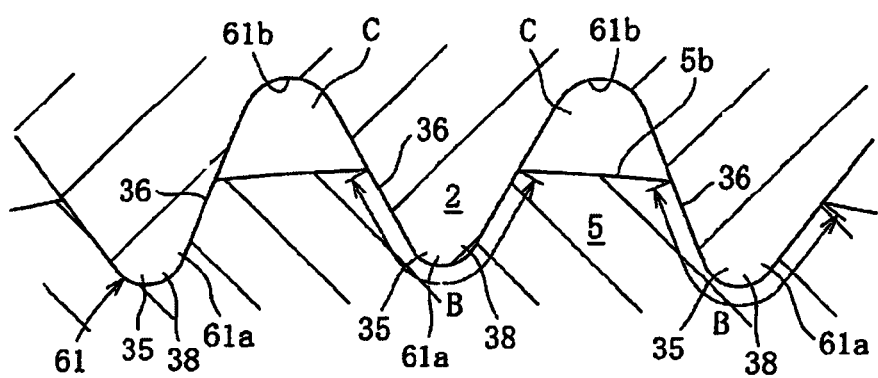
FIG. 42 is an enlarged view of main components in FIG. 41.

A constant velocity universal joint mounted by random matching can be an undercut-free constant velocity universal joint shown in FIG. 39 or a DOJ-type constant velocity universal joint shown in FIG. 40. According to each embodiment described above, the spline 41 configuring the projections 35 on the shaft 5 side is formed. In addition, the hardening process is performed on the spline 41 of the shaft 5, and the inner diameter surface of the inner member 2 is un-hardened (raw material). However, on the other hand, as shown in FIG. 41 and FIG. 42, the spline 61 (formed by the projection line 61*a* and the recess line 61*b*) can be formed in which the hardening process is performed on the inner diameter surface of the axis hole 22 of the inner member. The hardening process is not performed on the shaft 5. The spline 61 can also be formed by various processing methods that have been public knowledge since the past, such as a broaching process, a cutting process, a pressing process, and an extraction process. As the thermoset processing, various heal treatments can be used, such as induction hardening, and carburizing and quenching In this case, the projecting direction intermediate region of the projection 35 corresponds to the position of the recess forming surface (outer diameter surface of the shaft 5) before the recess is formed. In other words, a minimum diameter (minimum inner diameter dimension of the projections 35) D4 of a circle connecting the peaks of the projections 35 that are the projection lines 61*a* of the spline 61 is set to be smaller than the outer diameter dimension D3 of the shaft 5. A minimum outer diameter dimension (inner diameter dimension of the axis hole inner diameter surface between projections) D5 of a circle connecting the bottoms of the recess lines 61b of the spline 61 is set to be greater than the outer diameter dimension D3 of the shaft 5. In other words, D4<D3<D5.

In this case, if the shaft 5 is pressed into the axis hole 22 of the inner member 2, the recesses 36 into which the projections 35 are fitted can be formed on the outer diameter surface 5b of the shaft 5 by the projections 35 on the inner member 2 side. As a result, an engaged state can be configured in which the engagement contacting regions 38 of the projections 35 on the inner member 2 side and the recesses 36 of the shaft 5 are in close contact over the whole region.

Here, the engagement contacting regions 38 of the projections 35 and the recesses 36 of the shaft 5 are region B shown in FIG. 42. The region B is a region from the middle of the slope of to the peak in the cross-section. The gap C is formed between projections 35 adjacent in the circumferential direction. The gap C is formed closer to the outer diameter side than the outer diameter surface of the shaft 5.

In this case as well, the protruded section is formed by the press-fitting. Therefore, the pocket section for housing the protruded section is preferably provided. Unlike that shown in FIG. 10, the protruded section is formed on the shaft side. Therefore, the pocket section is provided on the inner member 2 side.

Even when the projection 35 of the recess-projection engagement configuration M is formed on the inner member 2 side in this way, the shoulder section can be provided on the end section of the shaft 5. The shoulder section performs centering when the outer diameter dimension of the shaft 5 is pressed into the inner member 2. As a result, a high accuracy press-fitting can be performed. In addition, the projection recess in a saw-tooth shape or the like that provides the dislocation stopping junction can be provided on the inner member 2 side.

The undercut-free constant velocity universal joint in FIG. 39 specifically includes and outer member 73, an inner member 76, a plurality of balls 77, and a cage 78. The outer member 73 serves as the outer joint component in which a plurality of track grooves 72 are formed on an inner spherical surface (inner circumferential surface) 71 along the axial direction, the track grooves 72 being equal distances apart in the circumferential direction. The inner member 76 serves as the inner joint component in which a plurality of track grooves 75 forming pairs with the track grooves 72 of the outer member 73 are formed on an outer spherical surface (outer circumferential surface) 74 along the axial direction, the track grooves 75 being equal distances apart in the circumferential direction. The balls 77 are interposed between the track grooves 72 of the outer member 73 and the track grooves 75 of the inner member 76, and transmits torque. The cage 78 is interposed between the inner spherical surface 71 of the outer member 73 and the outer spherical surface 74 of the inner member 76, and holds the balls 77 serving as torque transmitting components.

A track groove 72 on the outer member 73, described above, includes a back side track groove 72a and an opening side track groove (straight track groove) 72b. The track groove 72a has a track bottom forming an are section. The track groove 72b has a track bottom that is a straight section parallel with the outer member axial line. A track groove 75 on the inner member 76 includes a back side track groove 75a and an opening side track groove 75b. The track groove 75a has a track bottom that is a straight section parallel with the outer member axial line. The track groove 72b has a track bottom forming an are section.

The DOJ-type constant velocity universal joint in FIG. 40 specifically includes and outer member 80, an inner member 90, a plurality of balls 100, and a cage 101. The outer member 80 serves as the outer joint component in which a plurality of linear track grooves 82 extending in the axial direction are formed on a cylindrical inner circumferential surface 84, the track grooves 82 being equal distances apart in the circumferential direction. The inner member 90 serves as the inner joint component in which a plurality of linear track grooves 92 extending in the axial direction and forming pairs with the track grooves 82 of the outer member 80 are formed on a spherical outer circumferential surface 94, the track grooves 82 being equal distances apart in the circumferential direction. The balls 100 are interposed between the track grooves 82 of the outer member 80 and the track grooves 92 of the inner member 90, and transmits torque. The cage 101 is interposed between the cylindrical inner circumferential surface 84 of the outer member 80 and the spherical outer circumferential surface 94 of the inner member 90, and holds the balls 100 serving as torque transmitting components.

In the undercut-free constant velocity universal joint shown in FIG. 39 and the DOJ-type constant velocity universal joint shown in FIG. 40, constituent elements including the outer members 73 and 80, the inner members 76 and 90, the balls 77 and 100, and the cages 78 and 101 are mounted by random matching. Moreover, the track grooves 72 and 82 of the outer members 73 and 80, and the track grooves 75 and 92 of the inner members 76 and 90 are formed by cold forging finish. The PCD gap of the ball tracks formed by the track grooves 72 and 82 of the outer members 73 and 80, and the track grooves 75 and 92 of the inner members 76 and 90 that work together with the track grooves 72 and 82 is preferably defined as being from −0.02 to +0.3 mm. Moreover, a horizontal cross-sectional shape of the track grooves 72 and 82 of the outer members 73 and 80, and the track grooves 75 and 92 of the inner members 76 and 90 can be a gothic arch that is in angular contact with the balls 100.

In the undercut-free constant velocity universal joint shown in FIG. 39 and the DOJ-type constant velocity universal joint shown in FIG. 40, as according to the above-described embodiments, the shaft 5 is connected to the inner members 76 and 90 by the above-described recess-projection engagement configuration M. As the recess-projection engagement configuration M, various configurations described above in FIG. 2, FIG. 3, FIG. 6. FIG. 7, FIG. 13, and the like can be used. As shown in FIG. 10 and FIG. 12, the pocket section storing the protruded sections formed by recess formation by press-fitting can be provided. Moreover, the shoulder section for centering with the axis hole of the inner joint component can be provided on the counter-projection side of the pocket section.

Therefore, even when the constant velocity universal joint is the undercut-free constant velocity universal joint shown in FIG. 39 or the DOJ-type constant velocity universal joint shown in FIG. 40, operation effects similar to those according to the above-described embodiments can be achieved, the embodiments of the present invention have been described above. However, the present invention is not limited to the embodiments. Various modifications can be made. For example, the shape of the projection 35 in the recess-projection engagement configuration has a triangular cross-section according to the embodiment shown in FIG. 3 and a trapezoidal cross-section (Mount Fuji-shaped) according to the embodiment shown in FIG. 6. However, projections in various other shapes, such as semicircular, semi-elliptical, rectangular, and the like can be used. Area of the projection 35, the number of projections 35, a circumferential direction arrangement pitch, and the like can be arbitrarily changed. In other words, it is not required that the splines 41 and 61 be formed and the projections (projection teeth) 41a and 61a of the splines 41 and 61 form the projections 35 of the recess-projection engagement configuration M. Something key-like can be used. Something that forms a wave-shaped mating surface can be used. Basically, what is required is mat the projections 35 disposed along the axial direction are pressed into the partner side, the projections 35 can form the recesses 36 on the partner side mat engages in close contact with the projections 35, the engagement contacting regions 38 of the projections 35 and of the corresponding recesses 36 are in close contact over the whole region, and rotational torque is transmitted between the inner member 2 and the shaft 5.

As the axis hole 22 of the inner member 2, an irregularly shaped hole other than a circular hole, such as a polygonal hole, can be used. The cross-sectional shape of the end section 5a of the shaft 5 fitting into the axis hole 22 can be an irregularly shaped cross-sectional shape other than a circular cross-sectional shape, such as a polygonal cross-sectional shape. Therefore, for example, the axis hole 22 of the inner member 2 can be the circular hole and the cross-sectional shape of the end section 5a of the shaft 5 can be a polygonal shape other than the circular shape. Edge sections thereof can be the above-described projections 35.

According to the above-described embodiments, as the shape of the pocket section 50, the circumferential direction groove 50 has the side surface 51b on the counter-spline side that is a tapered surface of which the diameter expands from a groove bottom 51c towards the counter-spline side. However, the side surface 51b is not necessarily required to be a tapered surface. Basically, what is required is that the formed protruded sections 45 can be stored (housed). Therefore, the volume of the pocket section 50 is that which can handle the formed pushed-out sections 45.

When the recess-projection 55 is provided, in FIG. 7, the recess-projection 55 is provided on the axial direction center section of the spline 41. However, the recess-projection 55 can be provided on the shaft end surface side of the spline 41. On the other hand, the recess-projection 55 can be provided on the counter-shaft end surface side. Moreover, the recess-projection 55 can be provided over an entire axial direction length of the spline 41. The numbers of and the shape of the projections (projection teeth) 55a of each recess-projection 55 are arbitrary. In other words, the recess-projection 55 can be provided on all projections 35 or on arbitrary projections 35 among all projections 35. As shown in FIG. 10 and the like, the recess-projection 55 can be formed on the shaft 5 including the pocket section 50. According to the embodiment, the recess-projection 55 is provided on the projections 41a of the spline 41 configuring the projections 35. However, the recess-projection 55 can be provided on the recesses 41b of the spline 41.

According to the above-described embodiments, thermoset processing is performed on the projections 35, and a projection corresponding side is an un-hardened region. The hardness of the projections 35 is made higher than the regions at which the recesses are formed. However, as long as a hardness difference is achieved, heat treatment can be performed on both or neither. Moreover, only the press-fitting starting end section of the projections when press-fitting is performed is required to have a higher hardness than the regions formed by the recesses 36. Therefore, the hardness of the overall projection 35 is not required to be high. Furthermore, the gap 40 is formed in FIG. 3 and the like. However, it can be that which wedges into the inner diameter surface 37 of the inner member 2 to the recesses between the projections 35. The hardness difference between the projection 35 side and the recess forming surface side formed by the projection 35 is preferably 30 points or more in HRC. However, as long as the projections 35 can be press-fitted, the hardness difference can be less than 30 points. As the above-described heat treatment method, for example, induction hardening, carburizing and quenching, tempering, and normalizing can be given. When the recesses 36 are formed on the inner diameter surface of the inner member 2 by the projections 35 of the shaft 5 during press-fitting, when carburizing and quenching is performed on the inner member 2, as a result of the inner diameter surface being anti-cementation processed, a layer with lower hardness than the projections 35 of the shaft 5 can be formed more easily on the inner diameter surface of the inner member 2. Moreover, when the projections 36 of the shaft 5 are formed by the projections 35 on the inner diameter of the inner member 2, as a result of a tempering process or a normalizing process being performed on the shaft 5, the hardness of the outer diameter surface of the shaft 5 can be made lower than that of the projections 35 on the inner diameter of the inner member 2 while ensuring torsional strength of the shaft 5.

According to the above-described embodiments, the end surface (press-fitting starting end) of the projection 35 is a surface perpendicular to the axial direction. However, the surface can be at a predetermined angle to the axial direction. In this case, the surface can be angled from the inner diameter side towards the outer diameter side to the counter-projection side or to the projection side. When the projections 35 are press-fitted, the side on which the recesses 36 are formed can be fixed and the side on which the projections 35 are formed can be moved. Alternatively, the side on which the projections 35 are formed can be fixed and the side on which the recesses 36 are formed can be moved. Moreover, both sides can be moved.

The invention claimed is:
1. A constant velocity universal joint including an outer joint component, an inner joint component inserted in the outer joint component, and a torque transmitting component that is interposed between the outer joint component and the inner joint component and performs torque transmission, the constant velocity universal joint comprising:
   a recess-projection engagement configuration that connects the inner joint component and a shaft pressed fitted into the inner joint component, wherein:
   the recess-projection engagement configuration has axially-extending projections provided on one of an outer diameter surface of the shaft and an inner diameter surface of the inner joint component, and recesses engaging with the projections in close contact and formed on the other of the outer diameter surface of the shaft and the inner diameter surface of the inner joint component by a transfer of the shape of the projections upon being press-fitted into the other of the outer diameter surface of the shaft and the inner diameter surface of the inner joint component along an axial direction,
   ends of the projections, on a press-fitting starting end side, are formed without chamfering,
   concave portions are formed, on the one of the outer diameter surface of the shaft and the inner diameter surface of the inner joint component, between the projections that are adjacent in the circumferential direction,
   convex portions are formed, on the other of the outer diameter surface of the shaft and the inner diameter surface of the inner joint component, between the recesses that are adjacent in the circumferential direction, protruded portions are formed by material from the formed recesses, engagement contacting regions of the projections and the recesses engaging with the projections are in close contact over the whole contacting regions, and radial gaps are formed between the concave portions and the convex portions.

2. The constant velocity universal joint according to claim 1, wherein:

a hardened layer is formed by induction hardening on an outer diameter side of the inner joint component, an inner diameter side of the inner joint component is in an un-quenched state, and in the recess-projection engagement configuration, engagement contacting regions of projections on the outer diameter surface of the shaft and recesses on an axial hole inner diameter surface of the inner joint component that engages with the projections are in close contact over the whole region.

3. The constant velocity universal joint according to claim 1, wherein:

projections extending in the axial direction are formed on the outer diameter surface of the shaft and recess grooves running along a circumferential direction are provided on the inner diameter surface of an axial hole of the inner joint component, and the recess-projection engagement configuration is configured in which the shaft is pressed into the axial hole of the inner joint component, recesses engaging in close contact with the projections are intermittently formed in the axial direction on the inner diameter surface of the axial hole of the inner joint component by the projections of the shaft, and the engagement contacting regions of the projections of the shaft and the recesses of the inner joint component are in close contact over the whole region.

4. The constant velocity universal joint according to claim 1, wherein:

projections extending in the axial direction are provided on the inner diameter surface of an axial hole of the inner joint component and recess grooves running along the circumferential direction are formed on the outer diameter surface of the shaft, and the recess-projection engagement configuration is configured in which the shaft is pressed into the axial hole of the inner joint component, recesses engaging in close contact with the projections are intermittently formed in the axial direction on the outer diameter surface of shaft by the projections of the inner joint component, and the engagement contacting regions of the projections of the inner joint component and the recesses of the shaft are in close contact over the whole region.

5. The constant velocity universal joint according to claim 1, wherein:

the constant velocity universal joint includes an outer member serving as the outer joint component in which a plurality of guide grooves extending in the axial direction are formed on an inner circumferential surface, an inner member serving as the inner joint component in which a plurality of guide grooves extending in the axial direction are formed on an outer circumferential surface, torque transmitting balls disposed on ball tracks formed by the guiding grooves of the outer member and the guiding grooves of the inner member working in cooperation, and a holder having pockets that holds the torque transmitting component, and balls are used as the torque transmitting component.

6. The constant velocity universal joint according to claim 5, wherein:

one of either the track grooves of the outer joint component or the track grooves of the inner joint component is formed by cold forging;

constituent elements including the outer joint component, the inner joint component, the balls, and a cage are mounted by random matching;

the inner joint component and the shaft fitted into an axial hole of the inner joint component are connected by the recess-projection engagement configuration; and engagement contacting regions of the projections of one of either the inner joint component or the shaft and the recesses of a partner component engaging with the projections are in close contact over the whole region.

7. The constant velocity universal joint according to claim 6, comprising:

an outer joint component in which a plurality of track grooves extending in an axial direction are formed on an inner circumferential surface;

an inner joint component in which a plurality of track grooves forming pairs with the track grooves of the outer joint component and extending in the axial direction are formed on an outer circumferential surface;

a plurality of balls that are interposed between the track grooves of the outer joint component and the track grooves of the inner joint component and transmits torque; and a cage that is interposed between the inner circumferential surface of the outer joint component and the outer circumferential surface of the inner joint component and holds the balls, wherein each overall track groove is formed into a curved line.

8. The constant velocity universal joint according to claim 6, comprising:

an outer joint component in which a plurality of track grooves extending in an axial direction are formed on an inner circumferential surface;

an inner joint component in which a plurality of track grooves forming pairs with the track grooves of the outer joint component and extending in the axial direction are formed on an outer circumferential surface;

a plurality of balls that are interposed between the track grooves of the outer joint component and the track grooves of the inner joint component and transmits torque; and a cage that is interposed between the inner circumferential surface of the outer joint component and the outer circumferential surface of the inner joint component and holds the balls, wherein one end of each track groove is a fixed type formed in a straight shape in parallel with an axial line.

9. The constant velocity universal joint according to claim 6, wherein:

the constant velocity universal joint is a slide-type that includes an outer joint component in which a plurality of track grooves extending in an axial direction are formed on a cylindrical outer circumferential surface;

an inner joint component in which a plurality of track grooves extending in the axial direction are formed on a spherical outer circumferential surface;

a plurality of balls that are interposed between the track grooves of the outer joint component and the track grooves of the inner joint component and transmits torque; and a cage that is interposed between the cylindrical outer circumferential surface of the outer joint component and the spherical outer circumferential surface of the inner joint component and holds the balls.

10. The constant velocity universal joint according to claim 6, wherein a horizontal cross-sectional shape of the track grooves of the outer joint component and the track grooves of the inner joint component is a gothic arch that is in angular contact with the balls.

11. The constant velocity universal joint according to claim 5, wherein:
one of either of the track grooves of the outer joint component or the track grooves of the inner joint component is formed by cold forging finish;
constituent elements including the outer joint component, the inner joint component, the balls, and a cage are selected and mounted such that a PCD (Pitch Circle Diameter) gap falls within a range of defined values;
the inner joint component and the shaft fitted into an axial hole of the inner joint component are connected by the recess-projection engagement configuration; and
engagement contacting regions of the projections of one of either the inner joint component or the shaft and the recesses of a partner component engaging with the projections are in close contact over the whole region.

12. The constant velocity universal joint according to claim 1, wherein:
the constant velocity universal joint is a cross-groove-type constant velocity universal joint including an outer member serving as the outer joint component in which a guide groove twisted in one circumferential direction to an axial line and a guide groove twisted in another circumferential direction are alternately provided on an inner circumferential surface, an inner member serving as the inner joint component in which guiding grooves are formed on an outer circumferential surface thereof each of which forms a pair with each guiding groove of the outer member and is twisted in the opposite direction of the counterpart guiding groove of the outer member, and a holder holding the torque transmitting component, and balls are used as the torque transmitting component.

13. The constant velocity universal joint according to claim 1, comprising:
an outer joint component on which three track grooves having roller guiding surfaces facing each other in the circumferential direction are formed;
a tripod component serving as the inner joint component including three leg shafts protruding in a radial direction; and
rollers serving as a torque transmitting component fitted onto the leg shafts such as to rotate freely and inserted into the track grooves, wherein
the rollers can move in the axial direction of the outer joint component along the roller guiding surfaces.

14. The constant velocity universal joint according to claim 1, wherein projections are formed on the shaft, and recesses that engage in close contact with the projections are formed on an axial hole inner diameter surface of the inner joint component by the projection by hardness of at least an axial direction end section of the projections being higher than that of the axial hole inner diameter section of the inner joint component and the shaft being pressed into the axial hole of the inner joint component from the axial direction end section side of the projections.

15. The constant velocity universal joint according to claim 14, wherein a pocket section for storing a protruded section formed as a result of recess formation by the press-fitting is provided on the shaft.

16. The constant velocity universal joint according to claim 15, wherein the pocket section for storing the protruded section is provided on a press-fitting starting end side of the projections of the shaft and a shoulder section for centering with the axial hole of the inner joint component is provided on a counter-projection side of the pocket section.

17. The constant velocity universal joint according to claim 1, wherein projections are formed on an inner diameter surface of an axial hole of the inner joint component, and recesses that engage in close contact with the projections are formed on an outer diameter surface of the shaft by the projection by hardness of at least an axial direction end section of the projections being higher than that of outer diameter section of the shaft and the projections on the inner joint component side being pressed into the shaft from the axial direction end section side thereof.

18. The constant velocity universal joint according to claim 17, wherein a pocket section for storing a protruded section formed as a result of recess formation by the press-fitting is provided on the inner diameter surface of the axial hole of the inner joint component.

19. The constant velocity universal joint according to claim 1, wherein any region of a projection in a projecting direction corresponds with a recess forming surface before the recess is formed.

20. The constant velocity universal joint according to claim 19, wherein a maximum diameter dimension of an arc connecting peaks of a plurality of projections provided on a shaft outer diameter is greater than an inner diameter dimension of an axial hole of the inner joint component, and a maximum outer diameter dimension of a shaft outer diameter surface between adjacent projections is smaller than the inner diameter dimension of the axial hole of the inner joint component.

21. The constant velocity universal joint according to claim 19, wherein a minimum diameter dimension of an arc connecting peaks of a plurality of projections on the axial hole is smaller than an outer diameter dimension of the inner joint component fitting section of the shaft, and a minimum inner diameter dimension of an axis hole inner diameter surface between adjacent projections is greater than the outer diameter dimension of the inner joint component fitting section of the shaft.

22. The constant velocity universal joint according to claim 1, wherein a circumferential direction thickness of a projecting direction intermediate region of the projection is smaller than a circumferential direction dimension at a position corresponding to the intermediate region between projections adjacent in the circumferential direction.

23. The constant velocity universal joint according to claim 1, wherein a total sum of a circumferential direction thickness of projecting direction intermediate regions of the projections is smaller than a total sum of a circumferential direction thickness at positions corresponding to intermediate regions of the projections of the partner side engaging between projections adjacent in the circumferential direction.

24. The constant velocity universal joint according to claim 1, wherein a recess-projection running along the axial direction is provided on at least a portion of the projection side in the axial direction.

25. A constant velocity universal joint including an outer joint component, an inner joint component inserted in the outer joint component, and a torque transmitting component that is interposed between the outer joint component and the inner joint component and performs torque transmission, the constant velocity universal joint comprising:
- a recess-projection engagement configuration that connects the inner joint component and a shaft pressed fitted into the inner joint component, wherein:
- the recess-projection engagement configuration has axially-extending projections provided on one of an outer diameter surface of the shaft and an inner diameter surface of the inner joint component, and recesses engaging with the projections in close contact and formed on the other of the outer diameter surface of the shaft and the inner diameter surface of the inner joint component by the projections being pressed into the other of the outer diameter surface of the shaft and the inner diameter surface of the inner joint component along an axial direction;
- concave portions are formed, on the one of the outer diameter surface of the shaft and the inner diameter surface of the inner joint component, between the projections that are adjacent in the circumferential direction;
- convex portions are formed, on the other of the outer diameter surface of the shaft and the inner diameter surface of the inner joint component, between the recesses that are adjacent in the circumferential direction;
- engagement contacting regions of the projections and the recesses engaging with the projections are in close contact over the whole region;
- radial gaps are formed between the concave portions and the convex portions;
- the constant velocity universal joint includes an outer member serving as the outer joint component in which a plurality of guide grooves extending in the axial direction are formed on an inner circumferential surface, an inner member serving as the inner joint component in which a plurality of guide grooves extending in the axial direction are formed on an outer circumferential surface, torque transmitting balls disposed on ball tracks formed by the guiding grooves of the outer member and the guiding grooves of the inner member working in cooperation, and a holder having pockets that holds the torque transmitting component, and balls are used as the torque transmitting component;
- one of either the track grooves of the outer joint component or the track grooves of the inner joint component is formed by cold forging;
- constituent elements including the outer joint component, the inner joint component, the balls, and a cage are mounted by random matching;
- the inner joint component and the shaft fitted into an axial hole of the inner joint component are connected by the recess-projection engagement configuration;
- engagement contacting regions of the projections of one of either the inner joint component or the shaft and the recesses of a partner component engaging with the projections are in close contact over the whole region; and
- a PCD gap of ball tracks formed by the track grooves of the outer joint component and the track grooves of the inner joint component working in cooperation with the outer joint component is −0.02 to +0.3 millimeters.

26. A constant velocity universal joint including an outer joint component, an inner joint component inserted in the outer joint component, and a torque transmitting component that is interposed between the outer joint component and the inner joint component and performs torque transmission, the constant velocity universal joint comprising:
- a recess-projection engagement configuration that connects the inner joint component and a shaft pressed fitted into the inner joint component, wherein:
- the recess-projection engagement configuration has axially-extending projections provided on one of an outer diameter surface of the shaft and an inner diameter surface of the inner joint component, and recesses engaging with the projections in close contact and formed on the other of the outer diameter surface of the shaft and the inner diameter surface of the inner joint component by the projections being pressed into the other of the outer diameter surface of the shaft and the inner diameter surface of the inner joint component along an axial direction,
- concave portions are formed, on the one of the outer diameter surface of the shaft and the inner diameter surface of the inner joint component, between the projections that are adjacent in the circumferential direction,
- convex portions are formed, on the other of the outer diameter surface of the shaft and the inner diameter surface of the inner joint component, between the recesses that are adjacent in the circumferential direction,
- engagement contacting regions of the projections and the recesses engaging with the projections are in close contact over the whole region,
- radial gaps are formed between the concave portions and the convex portions,
- a recess-projection running along the axial direction is provided on at least a portion of the projection side in the axial direction, and
- the recess-projection running along the axial direction on the projection side is formed into a saw-tooth shape.

* * * * *